United States Patent [19]

Linville

[11] Patent Number: 5,125,379
[45] Date of Patent: Jun. 30, 1992

[54] ROTARY ENGINE

[76] Inventor: Richard D. Linville, 6822 Mt. Orange Dr. NE., St. Petersburg, Fla. 33702

[21] Appl. No.: 607,457

[22] Filed: Oct. 31, 1990

[51] Int. Cl.[5] .......................... F02B 53/04; F01C 3/02
[52] U.S. Cl. .................................. 123/221; 418/188; 418/195
[58] Field of Search ................. 123/221; 418/195, 188, 418/207

[56]  References Cited

U.S. PATENT DOCUMENTS

| | | | |
|---|---|---|---|
| 2,674,982 | 4/1954 | McCall | 123/221 |
| 3,012,551 | 12/1961 | Renshaw | 123/221 |
| 3,208,437 | 9/1965 | Coulter | 123/221 |
| 3,232,041 | 2/1966 | Renshaw | 418/195 |
| 3,841,276 | 10/1974 | Case | 123/221 |
| 4,005,682 | 2/1971 | McCall et al. | 123/221 |

Primary Examiner—John J. Vrablik
Attorney, Agent, or Firm—Edmond T. Patnaude

[57] ABSTRACT

A rotary engine includes a housing in which two rotors are mounted on mutually transverse axes and are provided with lobes which interact with the sides of the other rotor to provide compression and combustion chambers in which a fuel is compressed and subsequently fired to exert a torque on one of the rotors as the rotors rotate in synchronism.

21 Claims, 18 Drawing Sheets

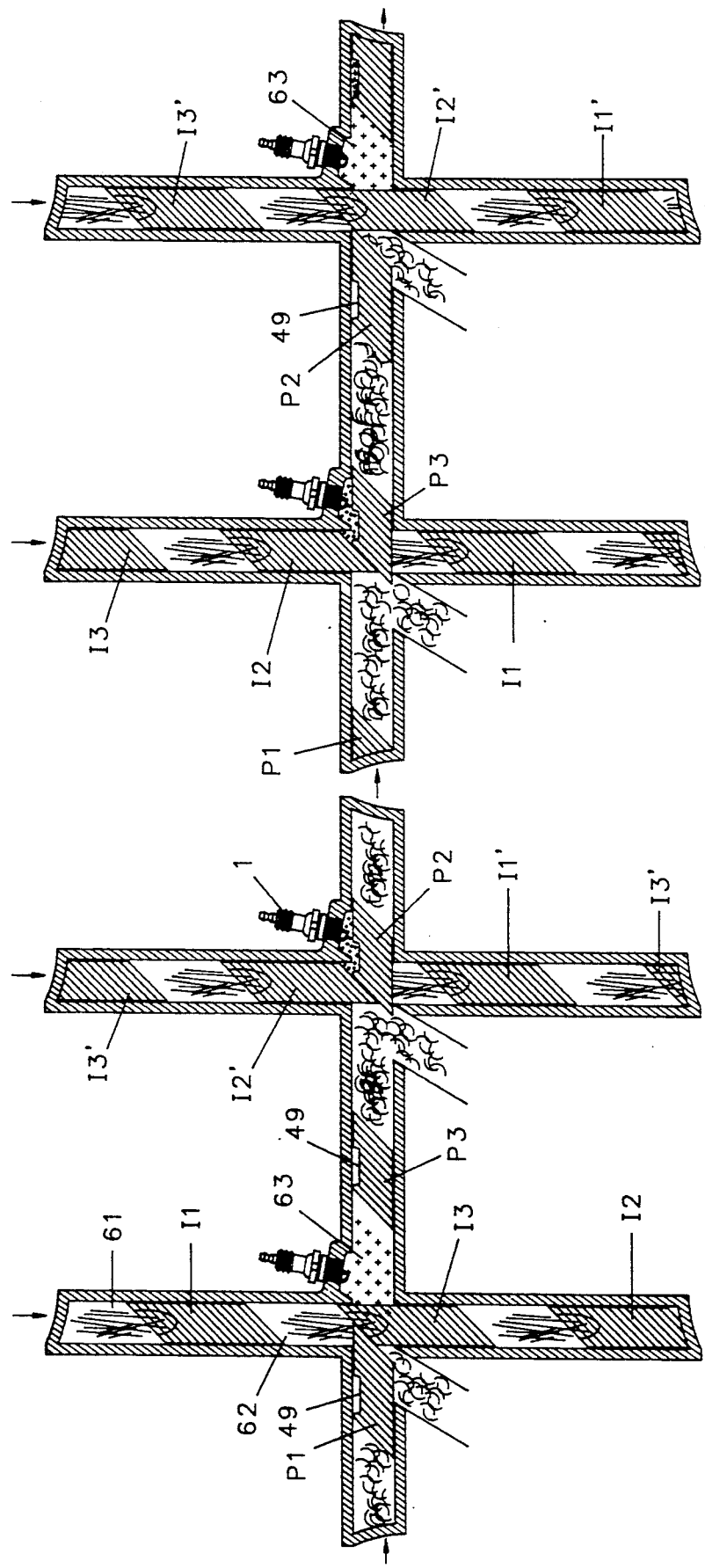

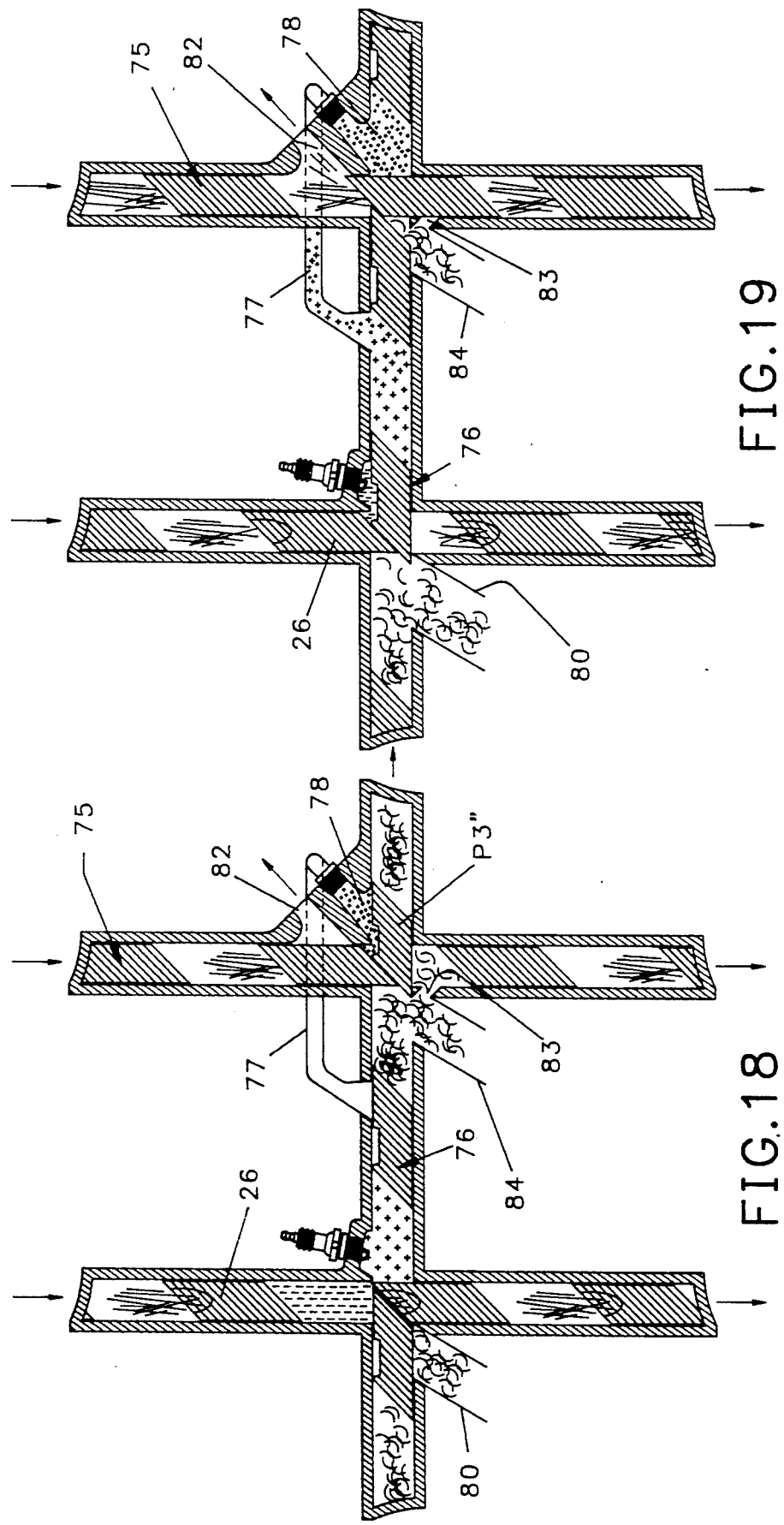

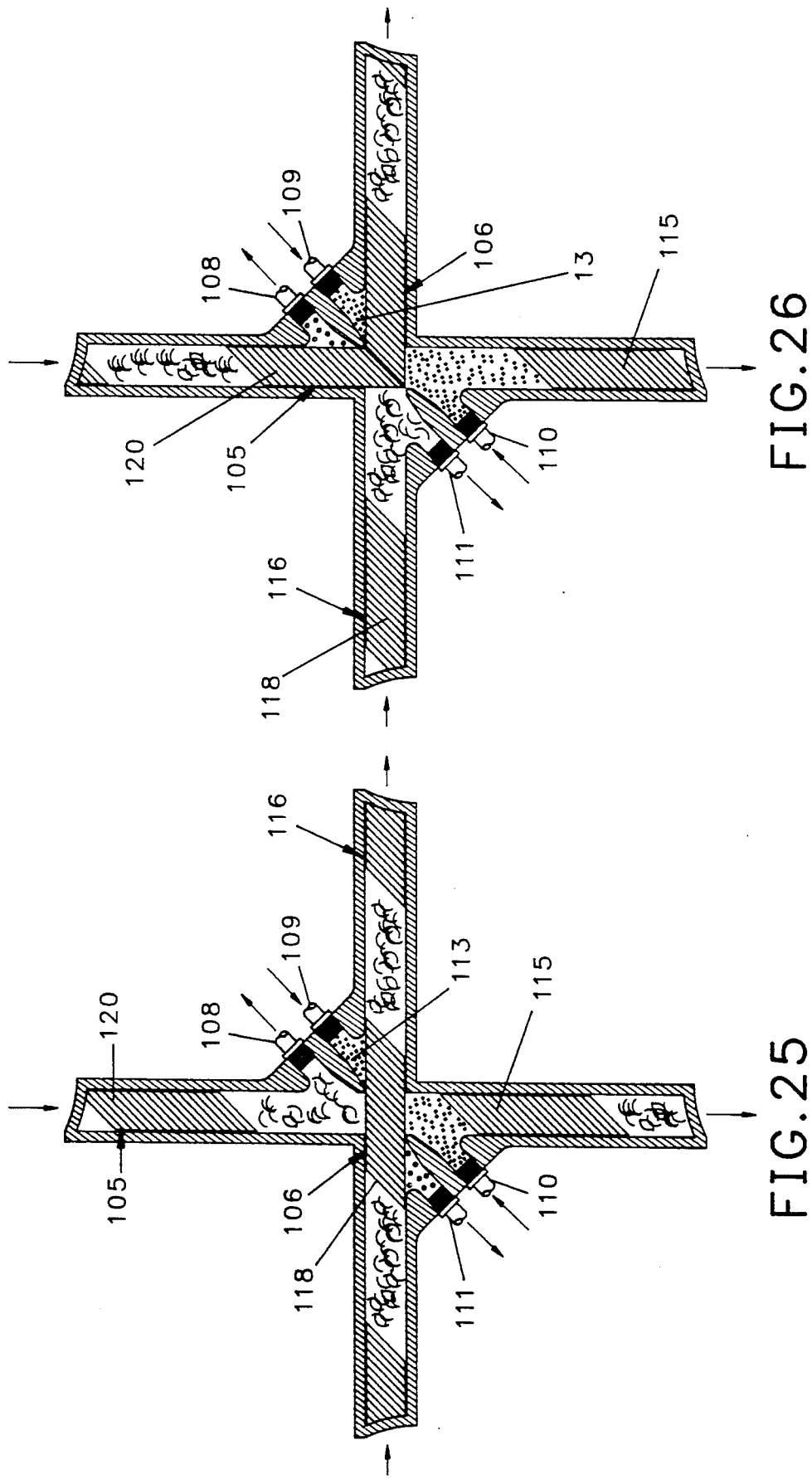

ROTARY ENGINE

The present invention relates in general to gas compression devices incorporating a plurality of synchronously driven interengaging rotors mounted for respective rotation about non-parallel axes, and it also relates to internal combustion engines incorporating a plurality of interengaging rotors mounted for respective rotation about non-parallel axes.

BACKGROUND OF THE INVENTION

Present day internal combustion engines are generally of the reciprocatory type utilizing one or more reciprocating pistons connected by a crankshaft to a drive shaft, or of the rotary type such as the Wankel engine which utilizes an eccentric rotor rotatably mounted in a housing chamber, or of the jet engine type wherein combustion takes place in one or more fixed combustion chambers to provide a thrust which can be used directly or which can be used to drive a turbine power take-off.

The reciprocatory engine and the Wankel engine have several disadvantages. They are plagued with high friction which generates useless heat and thus wastes energy and fuel. Moreover, being constricted to the use of the same volume for the expansion of gas during combustion as for the compression of gas prior to combustion, they are limited in the efficient use of fuel. The Wankel engines can produce only one power pulse per revolution per rotor and the reciprocatory engines can normally produce only one power pulse every other revolution per piston, and therefore, multiple pistons or rotors are required. In addition, both types of engines require the use of highly refined fuels to retard the combustion rate because both types of engines are limited to a low rate of gas expansion. Also, all of these prior art type engines must use excessive power to exhaust the burned gases, and the reciprocating and Wankel type engines rely greatly on a vacuum or an external power source to obtain good volumetric efficiency in supplying the fuel to the combustion chambers.

SUMMARY OF THE INVENTION

Briefly, there is provided in accordance with the present invention a new and improved rotary gas compression device which may be driven by an external power source to compress gas supplied thereto or which can be modified to incorporate a combustion chamber and ignition means to cause the device to function as an internal combustion engine to drive an output shaft. This device can also be modified to function as an air motor from a pressurized gas supply.

The invention is described in detail hereinafter in connection with an internal combustion engine incorporating the novel rotary compressor, but it will be understood by those skilled in the art that certain features of the invention have other applications where it is desired to compress gas or to derive power from gas in an efficient manner.

An engine constructed in accordance with the teachings of the present invention includes a housing having generally cylindrical chambers in which two or more interfitting rotors are respectively and sealably mounted for synchronous rotation on non-parallel axes. In the preferred embodiment the rotors are mounted on substantially orthogonal axes. The rotors have one or more peripheral lobes so shaped that as the rotors rotate in synchronism, the lobes on the first rotor, referred to hereinafter as an intake rotor, sequentially mate with the lobes and body of a second rotor, referred to hereinafter as the power rotor, and the lobes of the power rotor simultaneously mate with the lobes and body of the intake rotor. Combustible gas is introduced into the spaces between the trailing face of each lobe on the intake rotor and the leading face on the next lobe on the intake rotor and the side walls of the associated chamber. This space, which constitutes a variable volume compression chamber, is sealably confined between the rotors and the housing. As the rotors rotate in synchronism the compressed gas in the compression chamber is transferred, either by a transfer pocket in the side of a lobe on the power rotor or through valve means in the wall of the compression chamber, to an ignition chamber in the form of a recess in the wall of the housing adjacent to the confluence of the lobes on the intake rotor and the lobes on the power rotor. As the compression and transfer of the gas to the ignition chamber is completed, the leading face of the lobe on the intake rotor mates with the trailing face of the lobe on the power rotor, closing the compression chamber and opening a combustion chamber between the trailing face of the said lobe on the power rotor and the side of the lobe on the intake rotor. Upon ignition, the gas ignites and continues to burn and thus expand in this combustion chamber defined by the walls of the power rotor housing, the side wall of the intake rotor, and the trailing face of the lobe on the power rotor exerting force between the side of the lobe on the intake rotor and the trailing face of the lobe on the power rotor to rotate a power output shaft on which the power rotor is mounted.

The rotors are coupled together by a low-backlash gear train whereby a small portion of the power developed by the engine is used to drive the intake rotor. As the rotation of the power rotor continues, the leading face of the next following lobe on the power rotor mates with the trailing face of the lobe on the intake rotor and enters the combustion chamber whereby the burned gas is then confined between the trailing face of the forward lobe and the leading face of the following lobe. The gas in the space between the latter lobes is thus carried into communication with an exhaust port in the housing through which the burned gas is exhausted from the engine. The above-described sequence is repeated for each pair of lobes on the intake and power rotors.

In a preferred embodiment of the invention a plurality of intake rotors are interfitted with a single power rotor to increase the power output of the engine. In the engine described in detail hereinafter two intake rotors are provided, but it will be understood by those skilled in the art that additional intake rotors can be used by increasing the size of the power rotor. Also, each rotor is shown to have three lobes thereon but a lesser or greater number of lobes can be used, and while the lobes and intervening spaces are shown to be of equal angular length, the relative lengths of the spaces and lobes may be made longer or shorter in order to change inversely the degree of compression and subsequent expansion provided by the intake and power rotors.

In an alternative embodiment of the invention described in detail hereinafter, a compound engine includes an additional rotor which extracts additional energy from the burned gas exhausted from the power rotor.

In still another embodiment of the invention also described in detail hereinafter, the device uses compressed gas from an independent source to convert the expansion of said gas to motive power.

GENERAL DESCRIPTION OF THE DRAWINGS

Further objects and advantages and a better understanding of the present invention will be had by reference to the following detailed description taken in connection with the accompanying drawings wherein:

FIGS. 13 and 14 are schematic representations of phases of operation of the engine of FIG. 1 showing the two intake rotors and one power rotor in different angular positions;

FIGS. 18 and 19 are schematic representations of an alternative embodiment of the invention in the form of a compound engine using one intake rotor and an energy extraction rotor in combination with a power rotor;

FIGS. 23 through 26 are schematic representations of the cycles of another embodiment of the invention in the form of an air or gas operated motor powered by an independent source of air or gas.

DESCRIPTION OF PREFERRED EMBODIMENTS OF THE INVENTION

Figure 1:
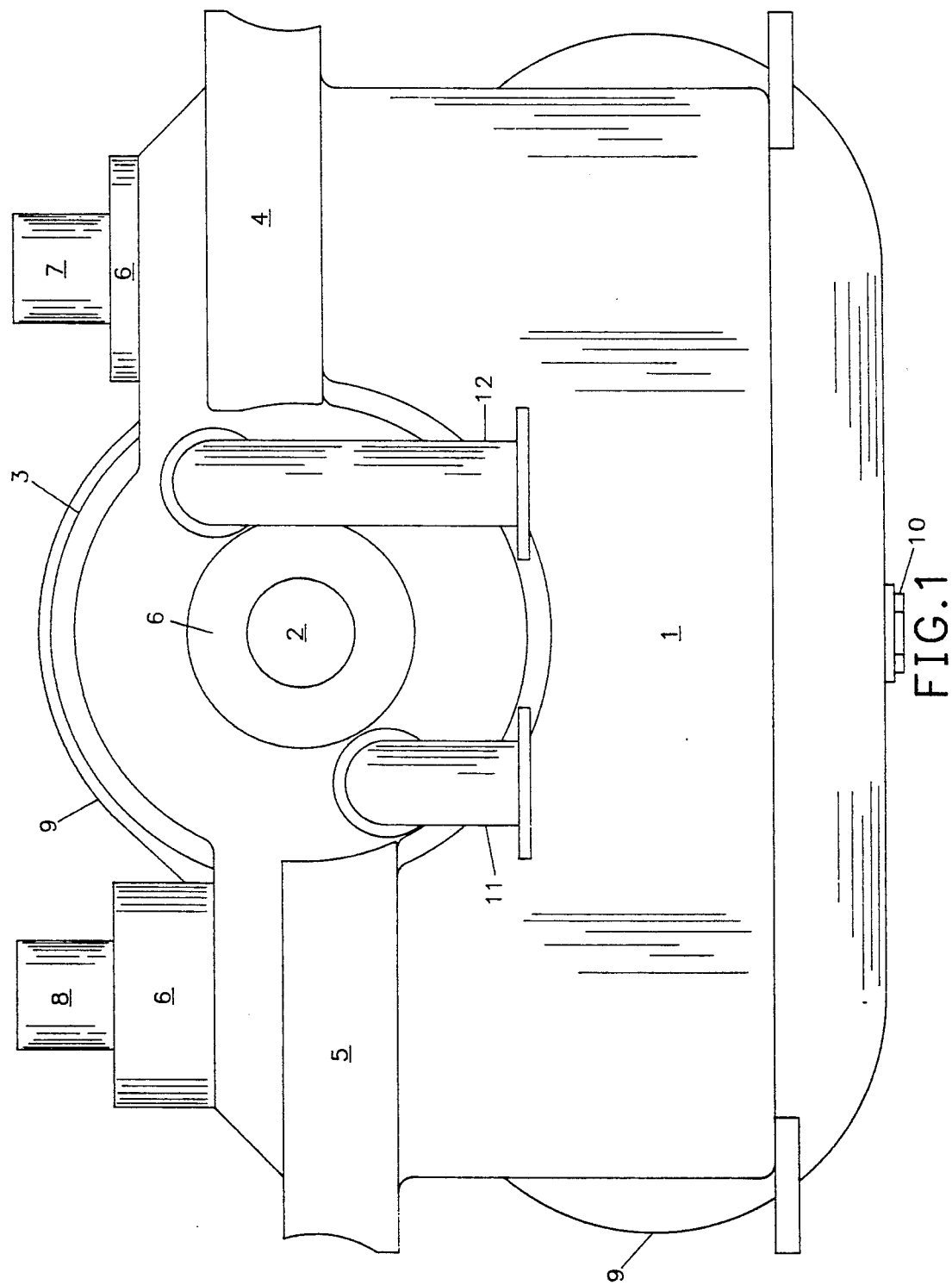
FIG. 1 is a front elevational view of an internal combustion engine embodying the present invention.

FIG. 1 is a front elevational view of a three rotor engine 1 consisting of a power rotor, not visible, which drives a shaft 2, of which is shown the accessory end which is used for driving suitable accessories such, for example, as a generator. A power rotor housing 3 having a generally cylindrical chamber in which the power rotor sealably rotates is mounted on a suitable motor frame. Also supported and maintained in alignment on the motor frame are a pair of intake rotor housings 4 and 5 and a bearing and sealing housing 6 for the shaft 2 and a pair of intake rotor shafts 7 and 8. The housings 4 and 5 each define cylindrical chambers in which a pair of intake rotors (not visible in FIG. 1) sealably rotate. The rotor shafts 7 and 8 are tubular and, while not visible in this view, provide fuel and air intake bores whose operation is more fully described hereinafter. On the drive end of the engine is a housing 9 containing a plurality of drive gears, and on the bottom of the gear housing 9 is an oil drain plug 10. Two exhaust pipes 11 and 12 extend from the power rotor housing 3.

Figure 2:
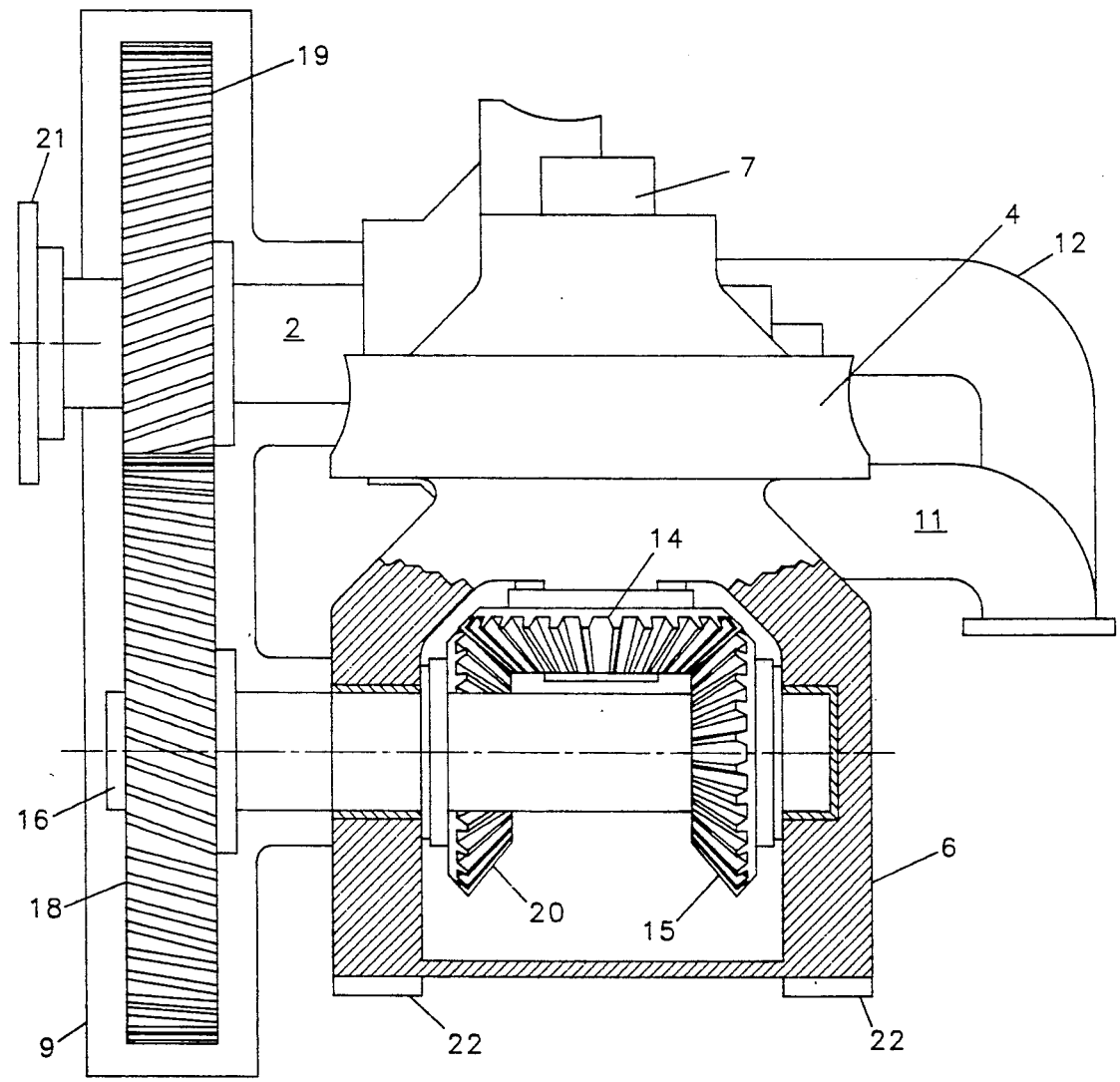
FIG. 2 is an end view of the engine shown in FIG. 1.

FIG. 2 is an end view of the left end of the engine as shown in FIG. 1 with portions of the housing broken away to show the gear train which connects the drive shaft 2 to the intake rotor shafts 7 and 8. Connected to the bottom of intake rotor shaft 8 is a drive miter gear 14 which is driven by a miter gear 15 mounted on a shaft 16. The shaft 16 is driven by a helical gear 18 which is meshed with a helical gear 19 mounted on the main drive shaft 2 which is driven by the power rotor of the engine. A miter gear 20 is mounted on a shaft, and drives the other intake rotor shaft 7, not visible in FIG. 2. The two miter gear drives are mounted in the gear case portion of the housing 6 which is connected to the main frame of the engine. An output coupling 21 is mounted to the main drive shaft 2. As shown, the helical gear trains are enclosed in the gear housing 9. A plurality of mounting feet 22 on the housing 6 support the engine.

Figure 3:
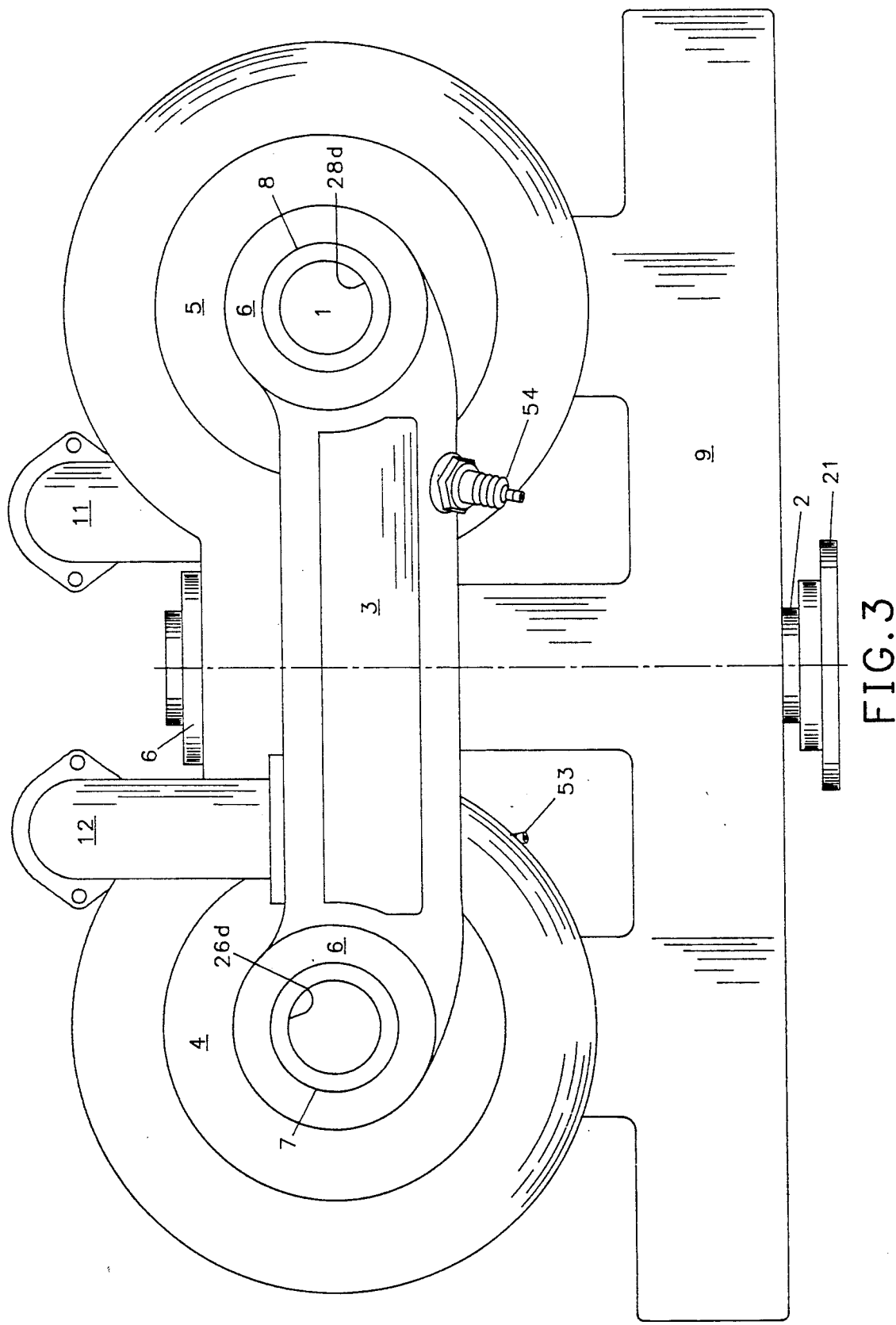
FIG. 3 is a top view of the engine shown in FIG. 1.

FIG. 3 is a top view of the rotary engine 1 in which the main frame supports the bearing and seal housing 6 which in turn locates and supports the power rotor shaft 2 and the intake rotor shafts 7 and 8. Also seen in this view is the power rotor housing 3 and the intake rotor housings 4 and 5. The intake rotor shafts 7 and 8 extend out of the housings 4 and 5 so that suitable piping can be connected thereto to direct fuel mixtures into the intake bores in the rotor shafts 7 and 8.

Figure 4:
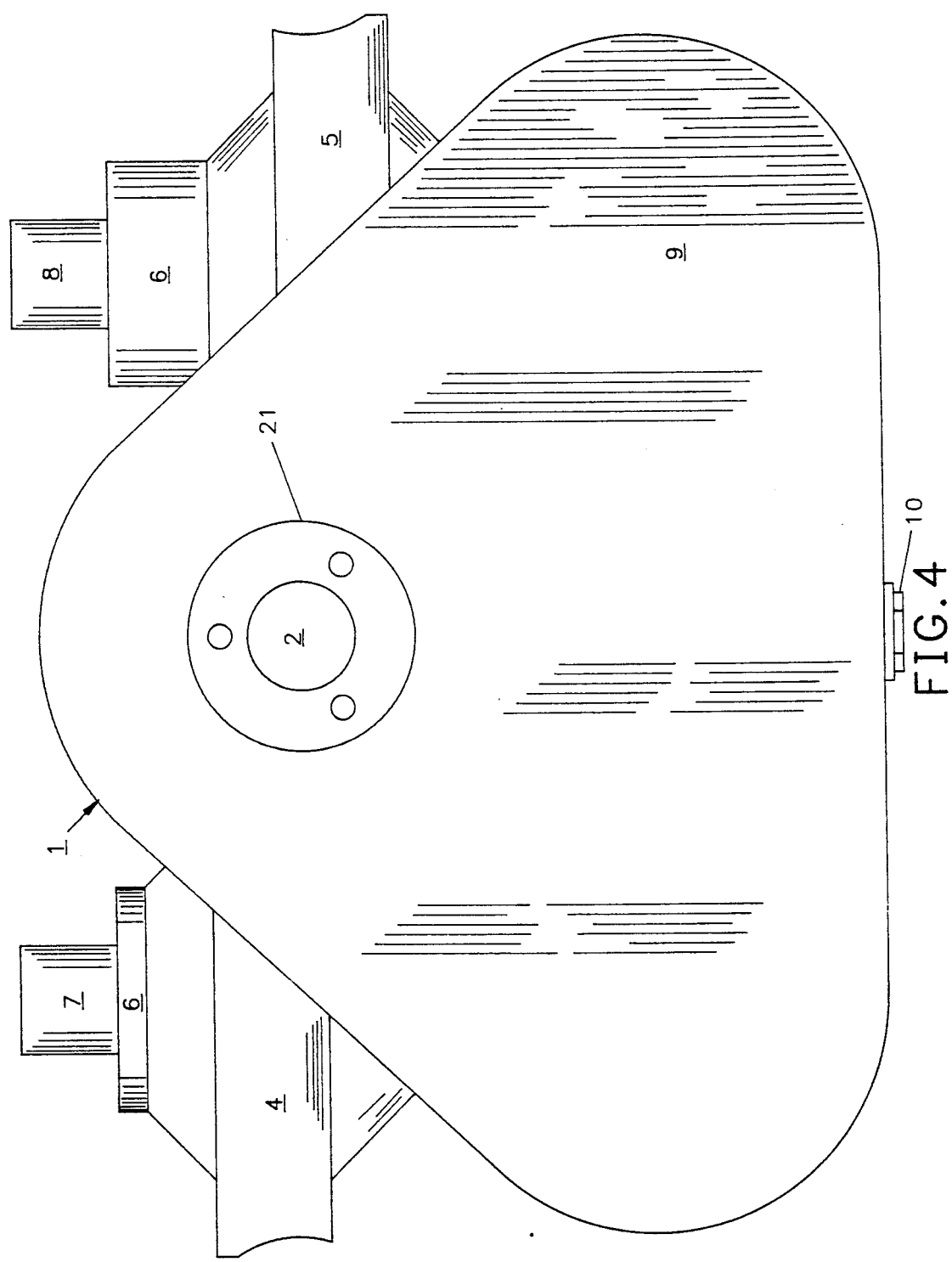
FIG. 4 is a rear, or power output side, view of the engine shown in FIG. 1.

FIG. 4 is a side elevation of the output drive side of the engine 1. Shown in this view is the helical gear housing 9 with its drain plug 10 and the output coupling 21 having three equally spaced mounting holes and mounted on the main power rotor shaft 2. Also seen are the intake rotor housing 4 and 5 and the bearing and seal housings 6 in which are located the input rotor shafts 7 and 8.

Figure 5:
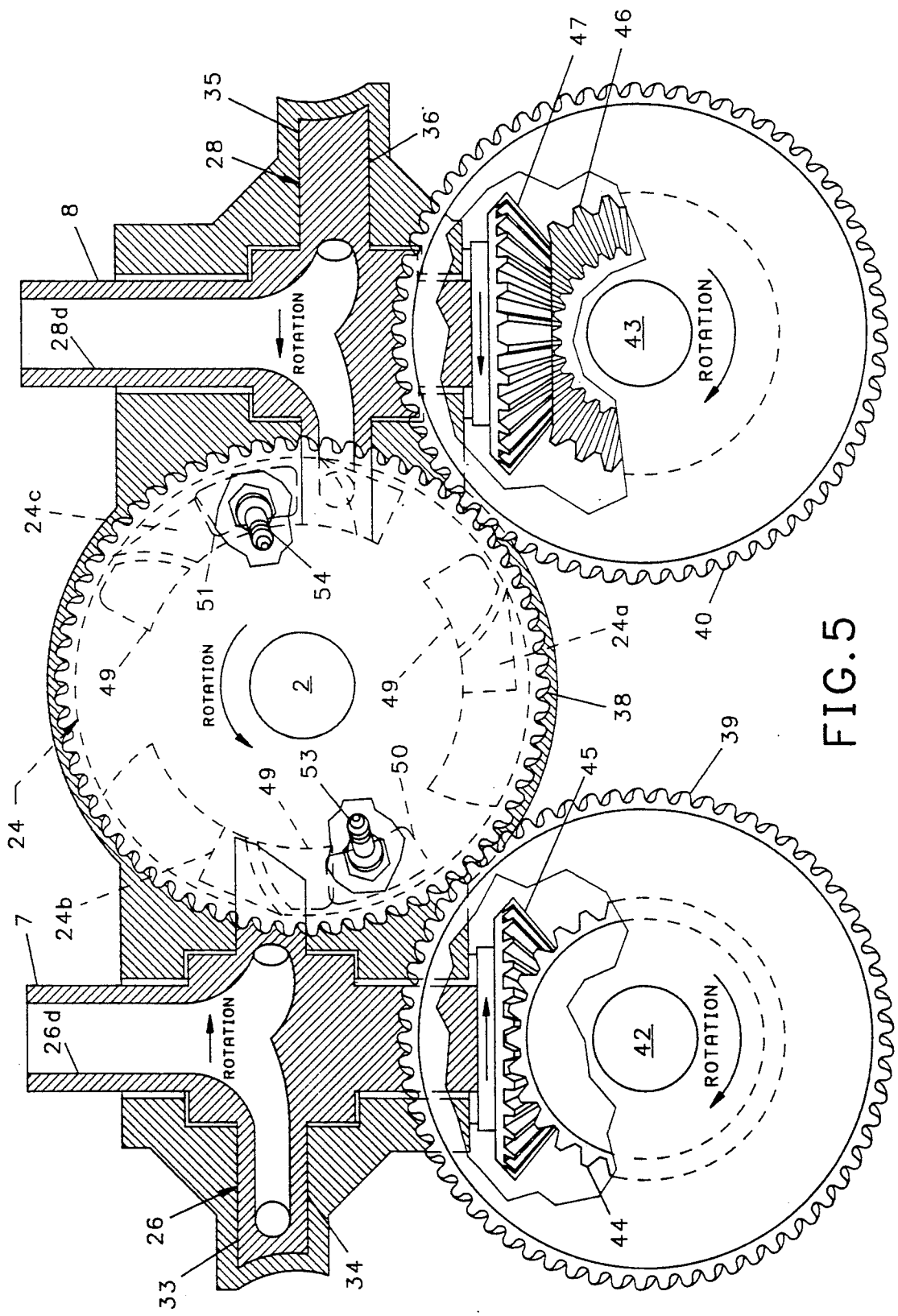
FIG. 5 is an illustrative cross-sectional view taken from the rear of the engine as viewed in FIG. 4.
Figure 6:
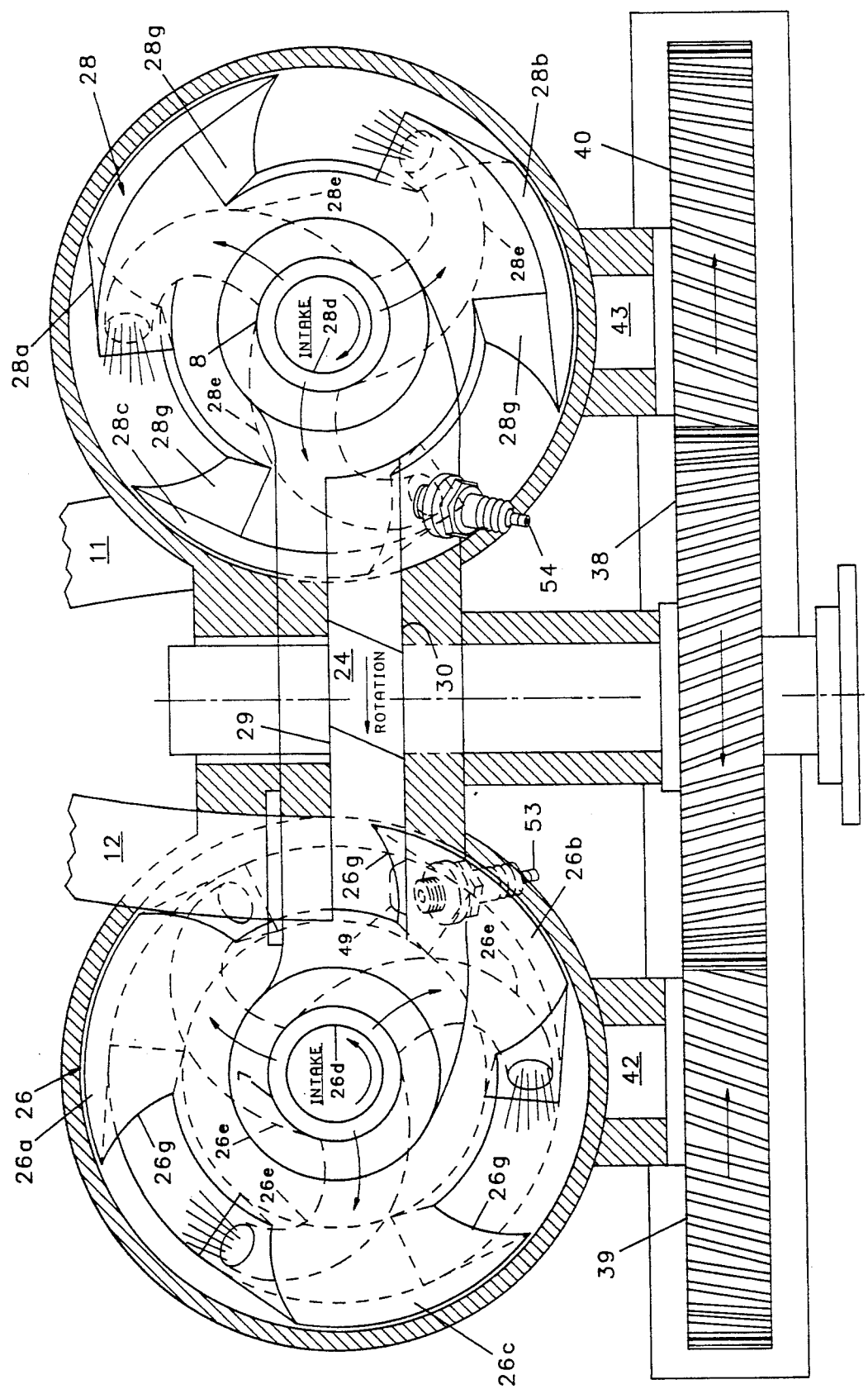
FIG. 6 is an illustrative cross-sectional view taken from the top of the engine as viewed in FIG. 3.
Figure 7:
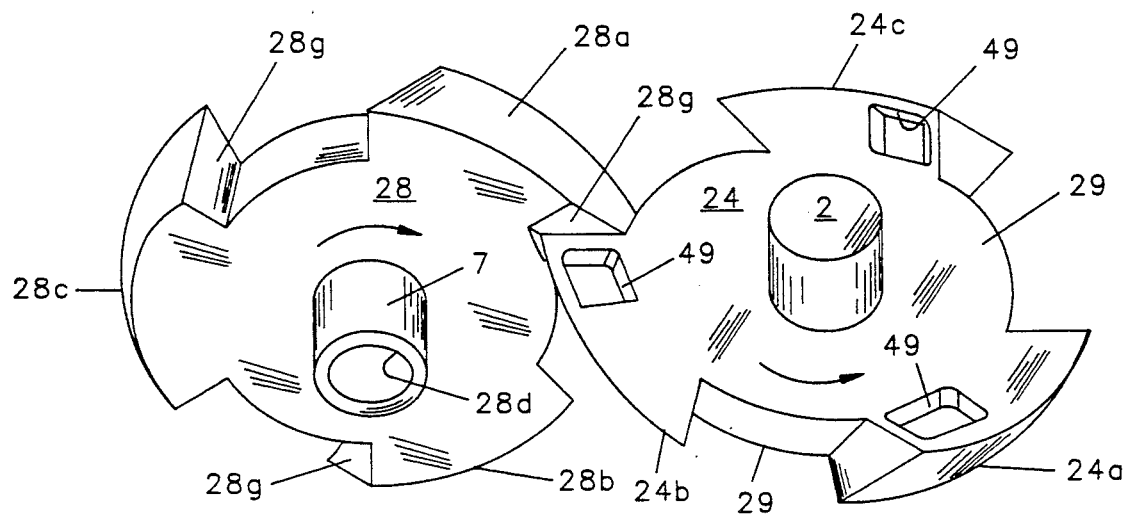
FIG. 7 is an isometric view of an intake rotor and a power rotor in mating relationship.

Referring particularly to FIGS. 5 and 6, a power rotor 24 is fixedly mounted on the rotatably mounted power output shaft 2. The shaft 2 is shown in the normal horizontal operating position. Two intake rotors 26 and 28 are disposed for rotation about mutually parallel vertical axes and respectively include the shafts 7 and 8 which are integral parts of the associated rotors. As best shown in FIGS. 5 and 7 the power rotor 24 is provided with three angularly spaced peripheral lobes 24a, 24b and 24c. As best shown in FIG. 6, the intake rotor 26 is provided with three angularly spaced lobes 26a, 26b and 26c, and the intake rotor 28, as also shown in FIG. 7, is provided with three angularly spaced lobes 28a, 28b and 28c. The lobes on the power rotor 24 have mutually parallel planar sides 29 and 30, and the axes of rotation of the intake rotors lie in the plane of the upper side 29 of the rotor 24 as it is shown in FIG. 6. Referring to FIG. 5, the lobes of the intake rotor 26 have mutually parallel planar sides 33 and 34, and the lobes of the intake rotor 28 have mutually parallel planar sides 35 and 36. It may be seen that the sides 34 and 35 lie in the same plane, and the axis of rotation of the power rotor 24 also lies in that plane.

In order to cause the three rotors to rotate in synchronism, they are interconnected by means of a gear train which includes the helical gear 19 drivingly connected to a plurality of helical gears 39 and 18 respectively mounted on a plurality of shafts 42 and 16. The miter gear 20 is mounted to the shaft 42 and is drivingly connected to a miter gear 45 which is mounted to the intake rotor 26, and a second set of miter gears 15 and 14 are similarly mounted to the shaft 16 and the intake rotor 28. While straight tooth miter gears are shown to improve clarity of illustration, spiral miter gears, or spiral bevel gears for ratio gearing, may be used to minimize backlash between the power and intake rotors. It will be seen that the gear drive causes the intake rotors to rotate in opposite directions because they are on opposite sides of the power rotor. They are actually rotating in the same direction relative to the power rotor in order to interface their lobes and spaces with the spaces and lobes on the power rotor.

In order to facilitate an understanding of the construction and operation of the engine 1, the seals and bearings on which the rotors and the gear train are mounted are not illustrated in the drawings, but it will be understood by those skilled in the art that conventional bearings and seals are used in the engine 1.

As shown in FIGS. 5 and 6, the intake rotors respectively include integral shaft portions 7 and 8 having upwardly opening axial bores 26d and 28d which connect at the inner ends thereof to sets of three radial passageways 26e and 28e respectively extending through the corresponding lobes and opening at the trailing faces thereof into the spaces between the lobes. The axial bores and the radial passageways constitute intake conduits through which combustible gas is supplied to the compression chambers as described in detail hereinafter. The rotor 26 rotates counterclockwise, and the rotor 28 rotates clockwise as indicated by the arrows on the shafts of the rotors 26 and 28 as shown in FIG. 6. Accordingly, as may be seen in FIG. 6, the passageways 26d and 28d open through the trailing faces of the lobes into the spaces between the lobes.

FIG. 7 illustrates the manner in which the rotors 24 and 28 mutually interengage as they rotate in synchronism with one another. It may be seen that the lobes on each of the rotors pass through the spaces between the lobes on the other rotor. The curved faces on the ends of the lobes on each rotor and the peripheral edges of the lobes on each rotor are shaped to mate closely with and thus sealingly engage with the arcuate complementary mating surfaces between the lobes of the other rotor as they move past those surfaces.

With particular reference to FIGS. 5 and 6 the top and bottom planar side surfaces of the rotor 24, which are identified by the reference numbers 29 and 30, and three gas transfer cavities or pockets 49 are provided in the side 30 in proximity to the trailing edges of the lobes on the rotor 24. In FIG. 6, only one of the transfer pockets is visible. As explained hereinafter, the transfer pockets 49 sequentially carry compressed gas from the space between the leading faces 26g of the rotor 26 and the side 30 of the rotor 24 to an ignition chamber 50 which is provided in the wall of the housing in proximity to the side 30 of the rotor 24, and a similar ignition chamber 51 is provided in the wall of the housing in proximity to the side 30 of the rotor 24 near the wall of the housing for the intake rotor 28. These ignition chambers 50 and 51 are constituted by recesses in the adjacent wall portions of the housing. A pair of conventional spark plugs 53 and 54 are mounted to the housing with the spark gaps disposed in the respective ignition chambers 50 and 51.

In operation, as the intake rotors 26 and 28 rotate, a combustible gas is supplied to the intake ducts 26d and 28d and flows through the connecting radial passageways 26e and 28e. As the trailing faces of the lobes on the intake rotors 26 and 28 pass out of the spaces between the corresponding pair of lobes on the power rotor 24 the incoming gas flow is momentarily cut off by the leading faces of the lobes on the power rotor 24 trapping the remaining gas between the leading faces of the next adjacent lobes on the rotors 26 and 28 and the side 30 of the rotor 24. Continued rotation of the rotors causes the leading faces of the lobes on the intake rotors to move toward the side of the power rotor 24 to compress the gas contained therein. At this same time the side 30 of the power rotor 24 is rotating to bring the transfer pockets 49 into communication with the compression chambers in the two intake rotors. Further rotation of the rotors brings the transfer pockets 49 into communication between the compression chambers and the ignition chambers 50 and 51. Gas flows past the corners of the housing common to the power rotor and the intake rotors through the transfer pockets into the ignition chambers where the gas is fully compressed and then ignited by the spark plugs 53 and 54. The burning gas then expands into the spaces between the trailing faces of the next adjacent lobes on the power rotor 24 and the sides 34 and 35 of the intake rotors 26 and 28 and applies a torque to the drive rotor 24. Thereafter, the spaces containing the burned gas travel into communication with a respective one of a pair of exhaust ports 11 and 12 which extend through the housing to the ambient in the usual manner.

In order to increase the efficiency of the engine, the spaces between the lobes on the power rotor can be increased and the arcuate lengths of the lobes on the intake rotors increased by the same amount. As a result, the degree of expansion of the burning gas is increased from that provided in the engine 1 where the compression chambers between the lobes on the intake rotors are of the same length as the combustion chambers between the lobes on the power rotor. In addition to increasing the efficiency of operation, increasing the lengths of the combustion chambers also reduces undesirable emissions from the engine.

References may now be made to FIGS. 8 through 12 for a better understanding of the operation of the engine. These Figs. show the operation of the intake rotor 26 and the power rotor 24 during one complete cycle of operation wherein the rotors each make one full revolution. In these figures the lobes on the intake rotor are labeled I1, I2, and I3, and the lobes on the power rotor are labeled P1, P2, and P3. The rotors are schematically shown in an unwrapped state so that the lobes on the intake rotor 26 are shown to move linearly in a downward direction and the lobes on the power rotor are shown to move linearly from left to right. The gaseous fuel enters the spaces between the lobes I1, I2 and I3 on the intake rotor through the radial passageway 26e through the bodies of the lobes and the ports in the trailing faces thereof.

Figure 8:
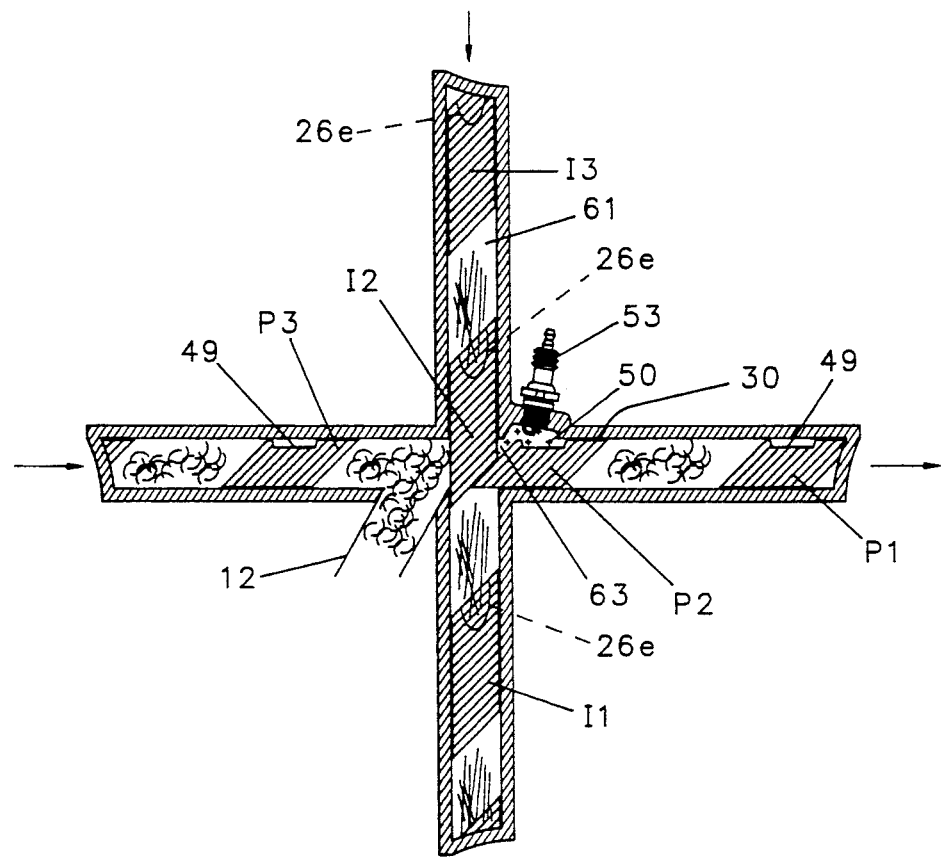
FIGS. 8 through 12 are schematic representations of the phases of operations of one complete cycle of operation of the engine of FIG. 1 showing one intake rotor and the power rotor in different angular positions during one complete cycle of operation of the engine.
Figure 9:
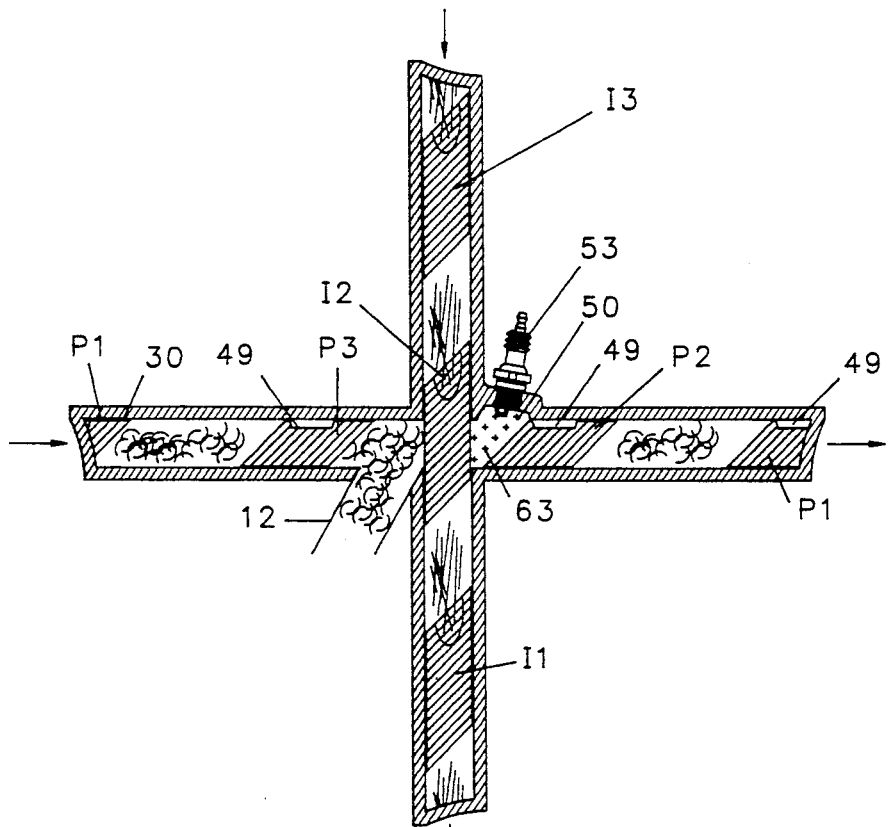
Figure 10:
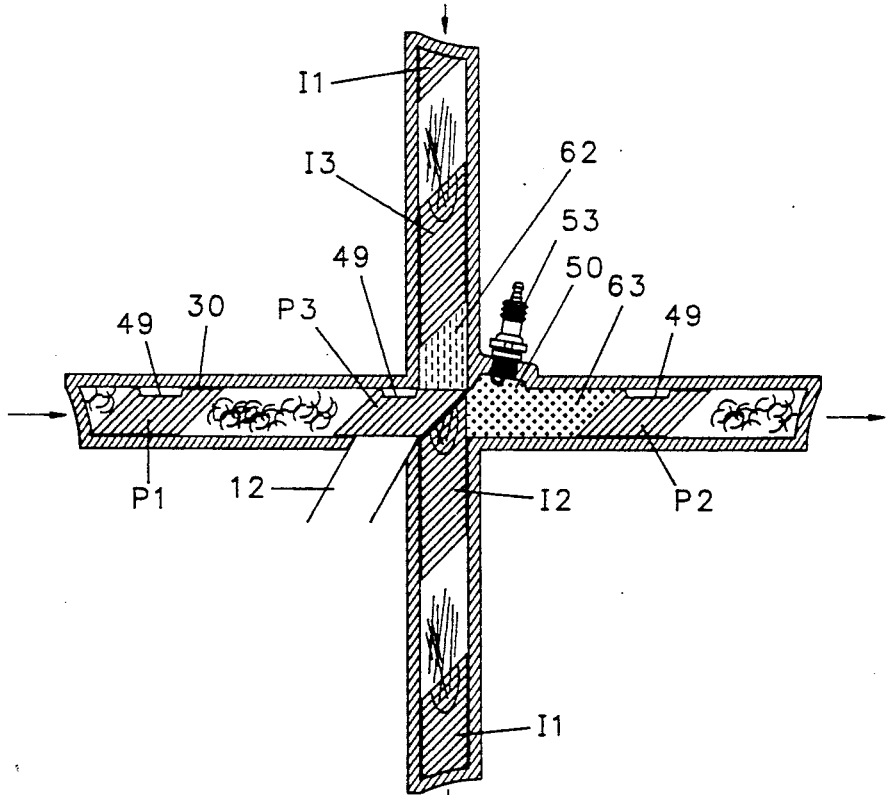
Figure 11:
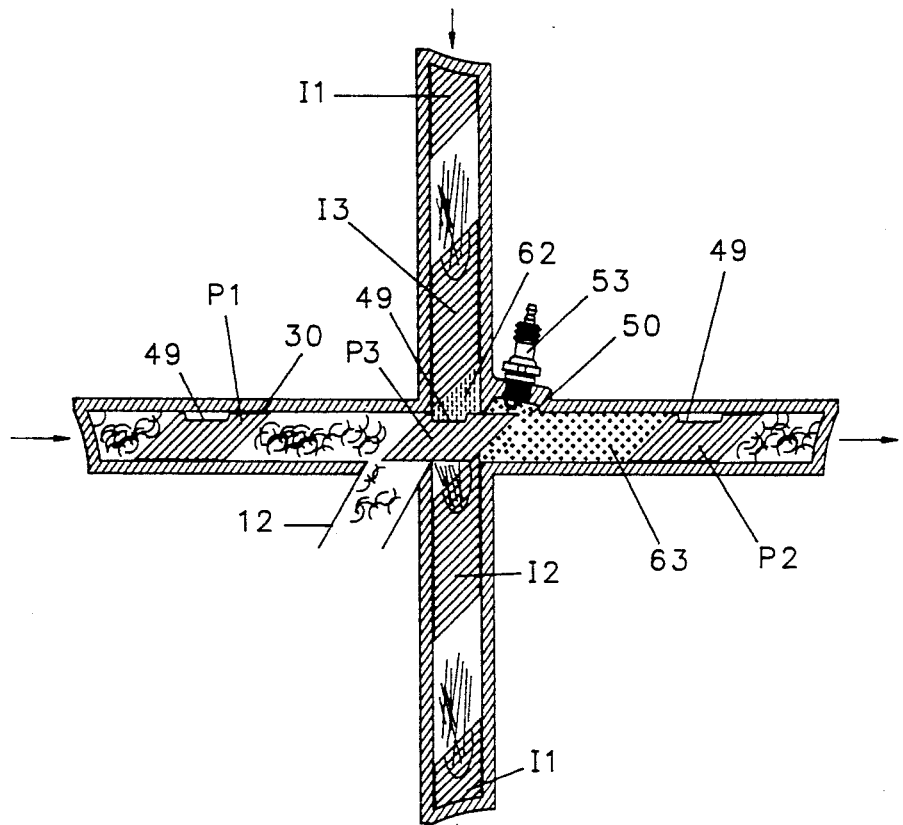
Figure 12:
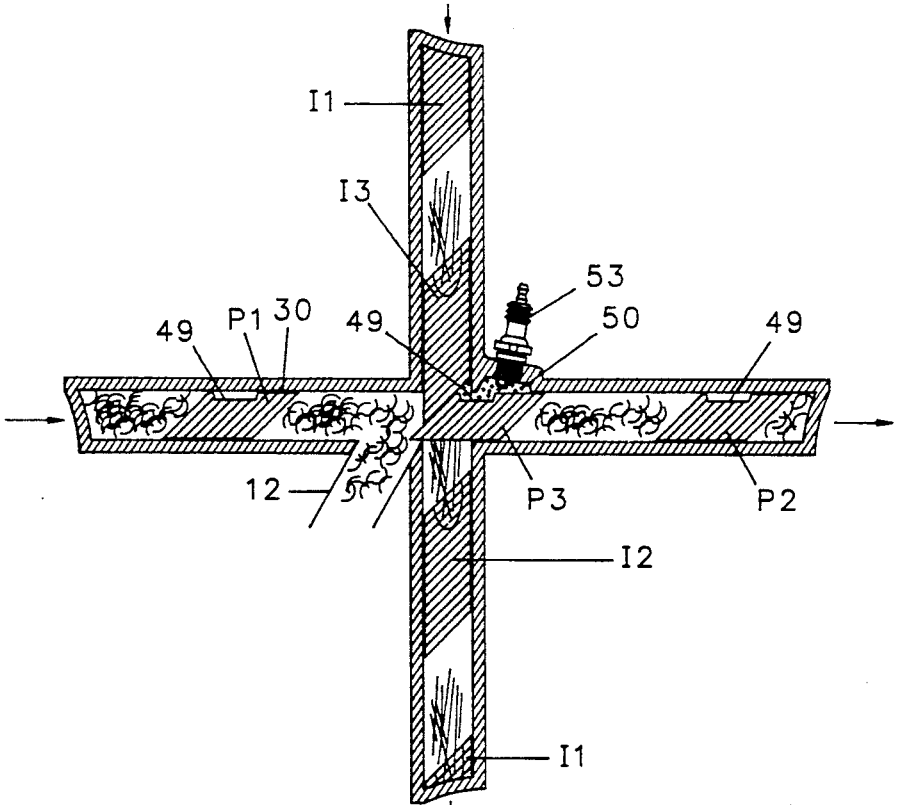

With reference to FIG. 8, gas 61 is confined between the leading edge of the lobe I3, the trailing face of the lobe I2, the peripheral wall of the rotor between the lobes I2 and I3 and the wall of the housing opposite to the space between the lobes I2 and I3. While following the sequential movement of lobes and spaces through FIGS. 9, 10, 11 and 12 note that the lobe P3 moves to the right and the lobes I2 and I3 move down, the leading face of lobe P3 moves across the trailing face of the lobe I2 to block off the inlet port 26e in the lobe I2 and to extend completely across the space between the wall of the housing as shown in FIG. 10. The space between the leading face of the lobe I3 and the side 30 of the lobe P3, which has now become a compression chamber 62, FIG. 10, decreases in size as the two rotors continue to rotate and the lobe I3 moves down toward the side of the lobe P3 to the position shown in FIG. 11 wherein the transfer pocket 49 has moved into communication with the compression chamber 62. When the rotors reach the position shown in FIG. 12 the transfer pocket 49 is also in communication with the ignition chamber 50 in the wall of the housing adjacent to the side 30 of the lobe P3 and the compressed gas 62 now flows into the ignition chamber 50. Compression is completed as the leading face of the lobe I3 traverses the trailing face of the lobe P3 and the gas is completely compressed in the ignition chamber 50 where it is ignited by a spark across the gap of the spark plug 53. The combustion portion of the cycle can best be seen by returning to FIG. 8. Now, the ignited gas in the ignition chamber 50 expands in the combustion chamber 63 now forming between the trailing face of the lobe P2 and the side of the lobe I2. FIG. 9 shows that the lobe P2 has moved further away from the side of the lobe I2 under the force of the expanding gas. FIGS. 10 and 11 show the further expansion of the burning gas. FIG. 12 shows the burned gas confined in the space between the lobes P2 and P3 as it is carried to the exhaust port 12 shown immediately to the left of the intake rotor.

While ignition is initiated by a spark from the spark plug in the engine 1, it will be apparent to those skilled in the art that the engine could be designed so as to cause the compressed gas to combust in the combustion chamber without the use of a spark plug or the like as in a Diesel engine.

Figure 8A:
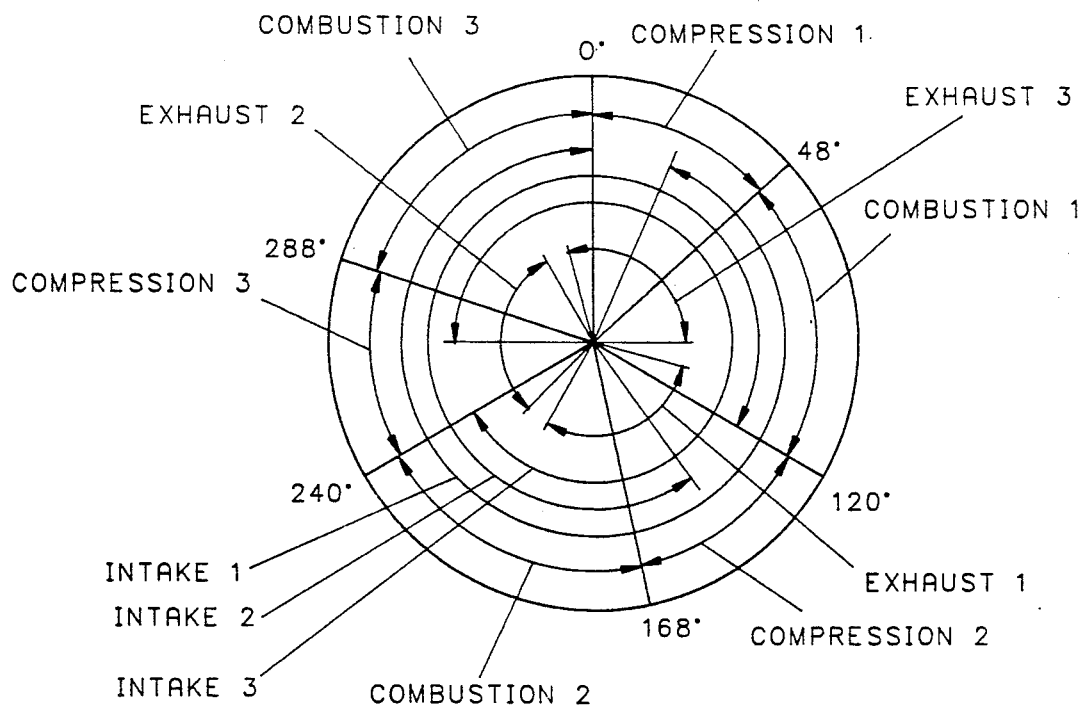
FIG. 8A is a chart showing the blended cycles of operation of the engine as illustrated FIGS. 8 through 12.

Referring to FIG. 8A there is shown a sequencing chart illustrating the timing of all the cycles of intake, compression, combustion and exhaust that take place as one pair of lobes on the intake and power rotors make one complete revolution. It is important to note that in this 2-rotor configuration the combustion phases do not overlap with any other compression or combustion cycles.

Referring to FIGS. 13 and 14, there is shown the engine 1 and the relationship between the phases of operation between the two three-lobe intake rotors and the three-lobe power rotor. It will be seen in FIG. 13 that the combustion phase between one of the intake rotors and the power rotor adds power to the power rotor at the time the gas is being compressed between the other intake rotor and the power rotor. The same conditions alternate in FIG. 14 when the combustion phase between the other intake rotor and the power rotor compresses the gas between the one intake rotor and the power rotor. This overlapping of the compression and combustion phases combined with the three-lobe configuration of all rotors gives the engine the smoothness of a twelve-cylinder piston engine. The construction features of the engine also expel the exhaust gasses and centrifugally supercharge the intake It will be seen that the ports are not obstructed by valves.

Figure 15:
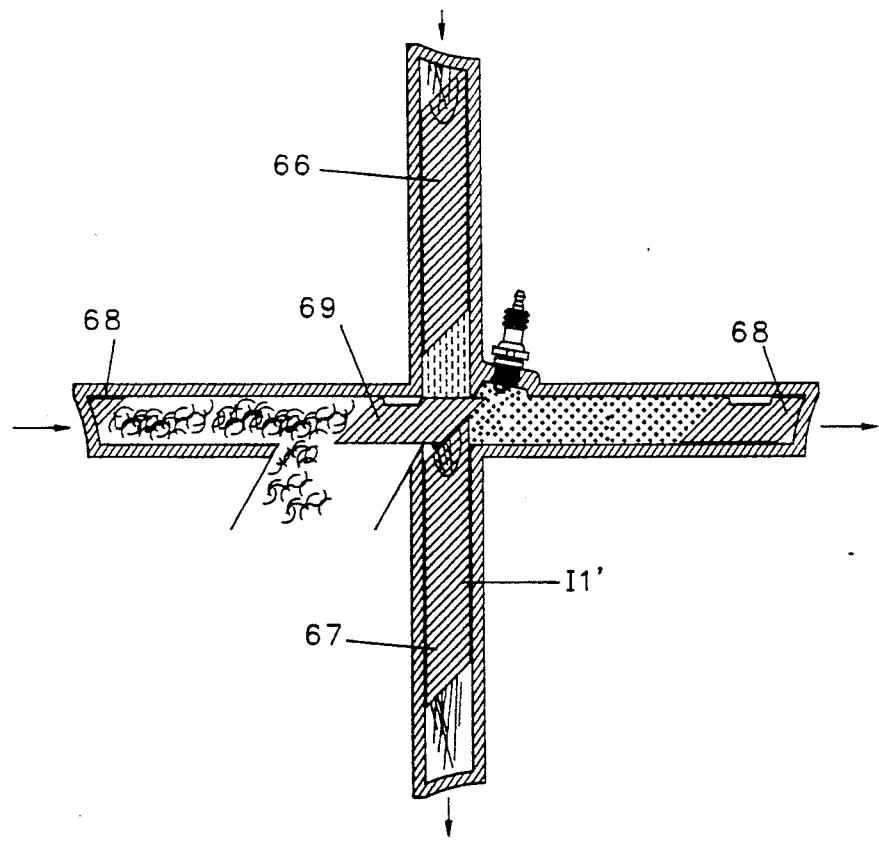
FIG. 15 is a schematic representation of phases of operation of the engine of FIG. 1, but with one intake and power rotor, each with but two lobes and spaces each, showing greatly enlarged combustion expansion for greater efficiency.

Moreover, engines having two lobes per rotor operate on the same principle as the three-lobed engine 1. In FIG. 15 there is shown in schematic form a rotary engine wherein the intake rotor has two lobes 66 and 67 the power rotor has two lobes 68 and 69. In this engine the combustion chambers 63 were purposely made longer than the compression chambers 62, permitting greater expansion of the burning gasses, adding greatly to the efficiency of the engine and cleaning up the emissions by allowing more complete combustion This engine operates in the same general way as does the engine 1.

As shown, the length of the lobes 66 and 67 are twice as long as the lobes 68 and 69 which causes the spaces between the lobes 66 and 67 to be one-half as long as the spaces between the lobes 68 and 69.

Figure 16:
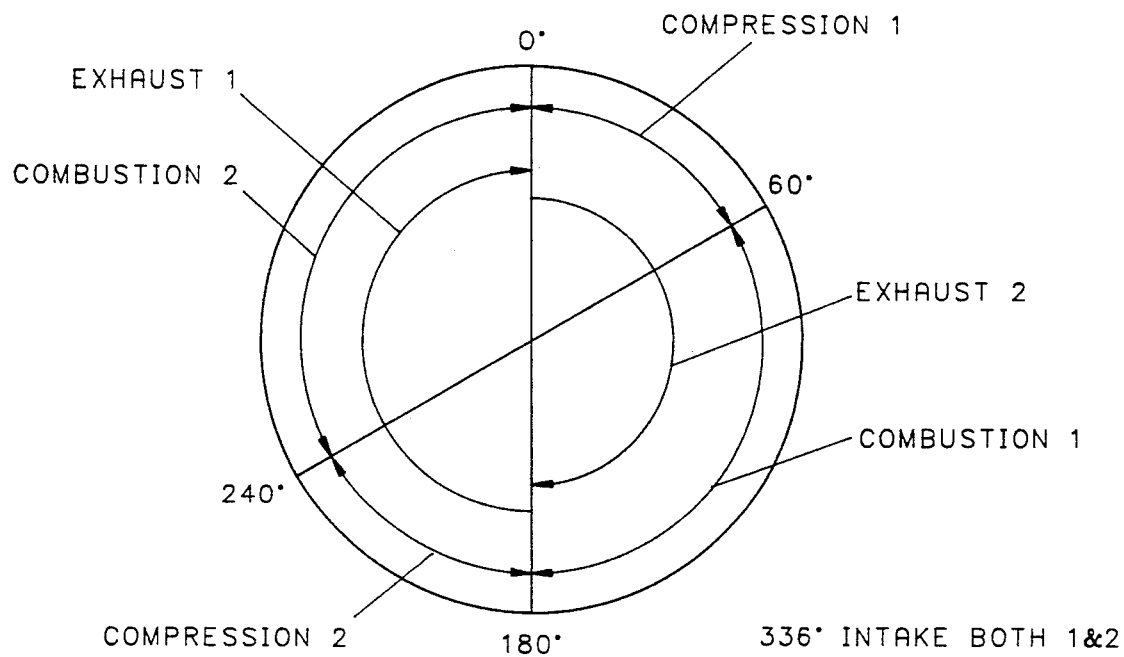
FIG. 16 is a chart of the cycles of operation of the engine of FIG. 15.

FIG. 16 shows the four-cycle sequencing diagram for the engine shown in FIG. 15. As seen in this diagram the compression phases are sixty degrees of rotation for each of the lobes on the intake rotors while the combustion phases last for one hundred twenty degrees. While the operation of this engine is the same as that described in connection with FIGS. 8 through 12, the advantage of this engine is that more energy is extracted from the burning gases to increase the operating efficiency of the engine and to decrease the amount of unburned gas exhausted to the atmosphere.

Figure 17:
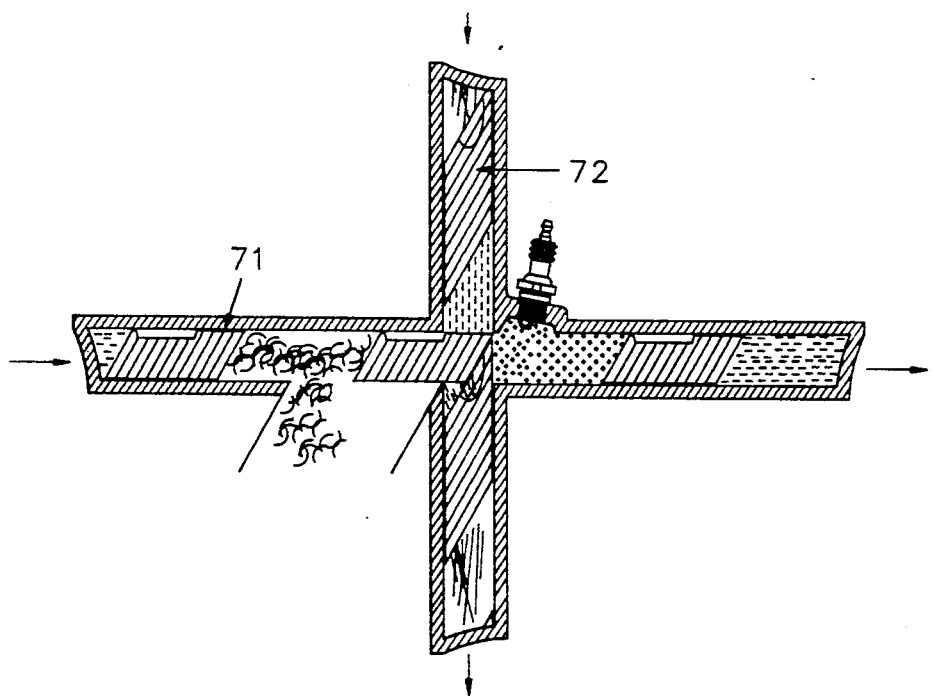
FIG. 17 is a schematic representation of another engine having one intake and one power rotor, the power rotor having three lobes and spaces but the intake rotor having but two lobes and spaces, in order to increase the speed of the intake rotor in a ratio of 3 to 2 of the power rotor and to decrease the angle of the faces of the lobes on the power rotor.

Referring to FIG. 17, there is shown in schematic form a two-rotor engine wherein a three-lobe power rotor 71 is fed by a two-lobe intake rotor 72 which rotates three times to every two revolutions of the power rotor. This engine is just one of the many configurations that can be adapted by the designer to accommodate the necessity of having a larger power rotor that turns more slowly and has many lobes on it but can be fed by several intake rotors that can turn at high speed. The difference in peripheral speed causes flattening of the leading and trailing faces on the lobes of the power rotor as is shown in FIG. 17 wherein the higher speed of the two-lobe intake rotor causes the leading and trailing faces on the intake rotor lobes to be longer than the lobes on the power rotor by a factor of three to two, reducing the angle of the faces on the power rotor.

Referring to FIGS. 18 and 19 there is shown in schematic form a compound engine which is similar in operation to the engine 1 insofar as the intake rotor 26 is concerned. However, a second rotor 75 which operates in conjunction with a power rotor 76 is not an intake rotor but rather, it is a compounding rotor used only to extract additional energy from the burning gas and hot burned gas under pressure in the spaces between the lobes on the power rotor 76. In this engine a conduit 77 is connected between one side of a cavity in the housing downstream of the combustion section and a recess 78 in the wall of the housing downstream of the confluence of the power rotor 76 and the second rotor 75 in approximately the same location as a second ignition chamber would be located in the engine 1. Inasmuch as the burning gas is not completely expanded after the normal combustion phase, it would remain in this condition while in the space as seen in FIG. 19 between the lobes on the power rotor 76 except for the conduit 77 which allows the hot gas to expand further in the recess 78 and between the trailing face of the lobe on the power rotor and the side of the compounding rotor lobe exerting more rotational force on the power rotor. This further expanded gas will be carried to an exhaust port 80 and exhausted between the trailing face of the lobe on the power rotor and the leading face of the next lobe on the power rotor.

Referring particularly to FIG. 18, the compounding rotor 75 has no passageways for the inlet of gases but has lobes and spaces the same as a normal intake rotor 26. Its lobes and spaces interface with those of the power rotor so that the sides of its lobes can back up any pressure that comes between it and the trailing face of any power rotor lobe. Inasmuch as there will always be some gas in the spaces between the lobes on the rotor 75, an auxiliary exhaust port 82 is provided to relieve the pressure from what would normally be the compression chamber. Then, to relieve any vacuum that would normally be produced when the trailing face of a lobe on the compounding rotor 75 leaves the side of lobe on the power rotor, an inlet port 83 is provided to take a portion of the exhaust gas still under some pressure and use it to counteract the vacuum and add some additional torque applied by said exhaust gas between the side of the lobe on the power rotor and the trailing face of the lobe on the compounding rotor. A second exhaust port 84 is provided to exhaust any gas which was not transferred through passageway 77 to the compounding rotor.

Figure 20:
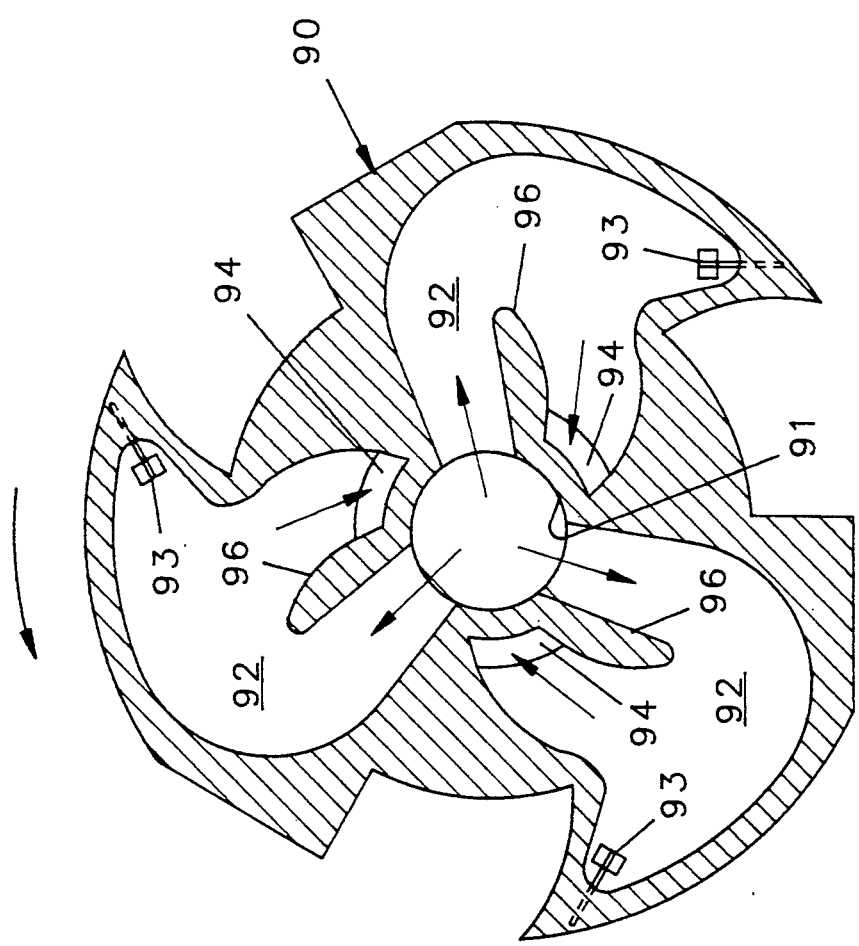
FIG. 20 is a sectional view of a power rotor including another embodiment of the invention showing internal cooling of a rotor.

FIG. 20 is a sectional view of a power rotor 90 showing a method of cooling the rotor from the inside. A cooling medium enters through an axial bore 91 in the rotor shaft and circulates through a plurality of passageways 92 absorbing heat from the inner walls of the rotor and from heat radiators 93 located in hot spots requiring additional cooling. When stationary, any slight pressure will circulate the cooling medium out through the return ducts 94 located at a larger radius than that of the central bore 91. A plurality of circulation vanes 96 rotate with the rotor. When rotating, the shape of the vanes 96 and the internal passageways 92 centrifugally cause the cooling medium to flow to the output ducts 94 and the flow is accelerated when heat is absorbed by the cooling medium which makes it expand and become lighter than the colder incoming cooling medium.

Figure 22:
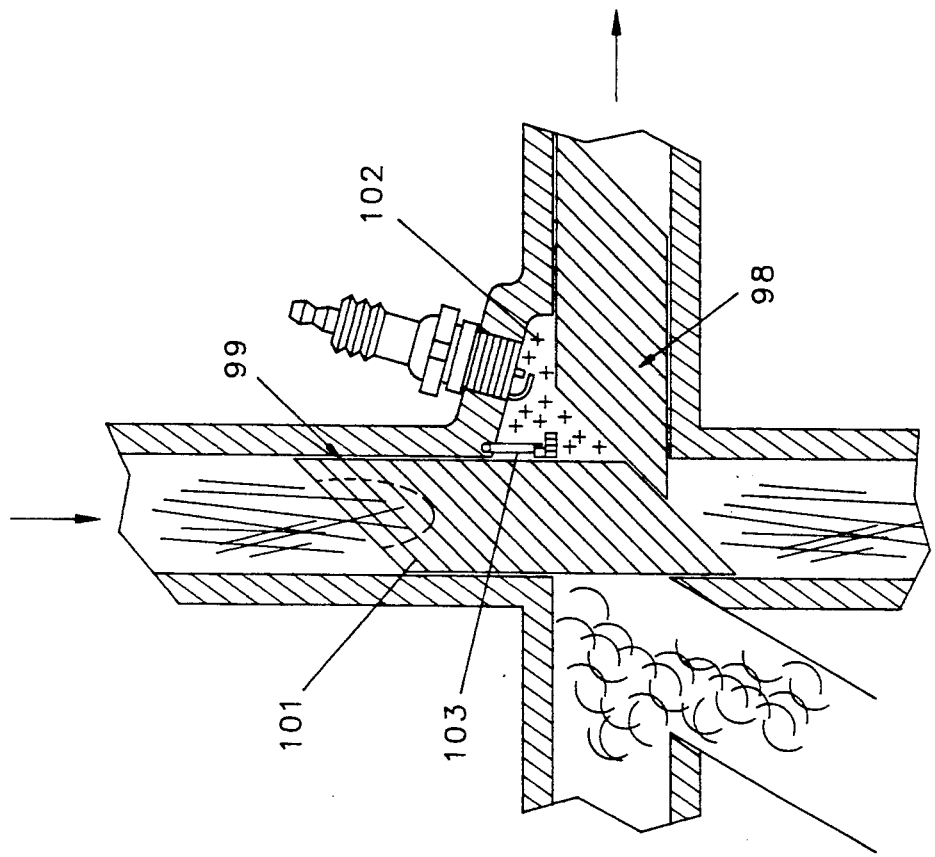
FIGS. 21 and 22 are sectional views of an intersection of an intake and power rotor in an engine as in FIG. 1 showing an alternative embodiment of the invention in the form of a valve between the compression chamber and the ignition chamber.
Figure 21:
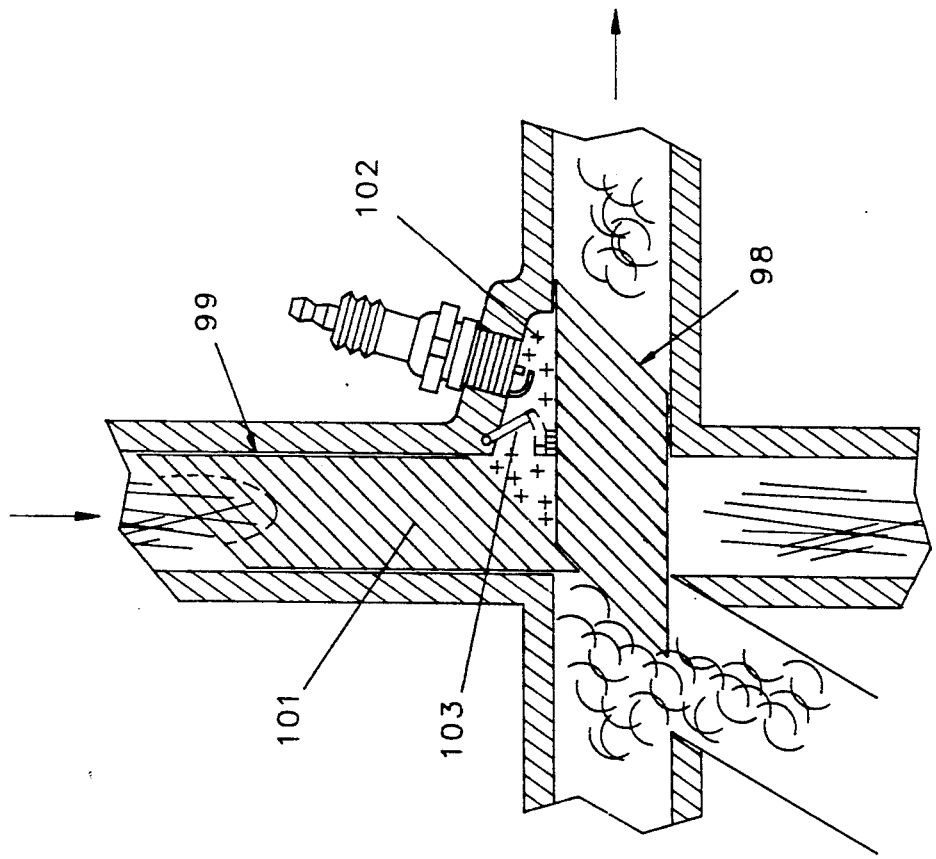
Figure 24:
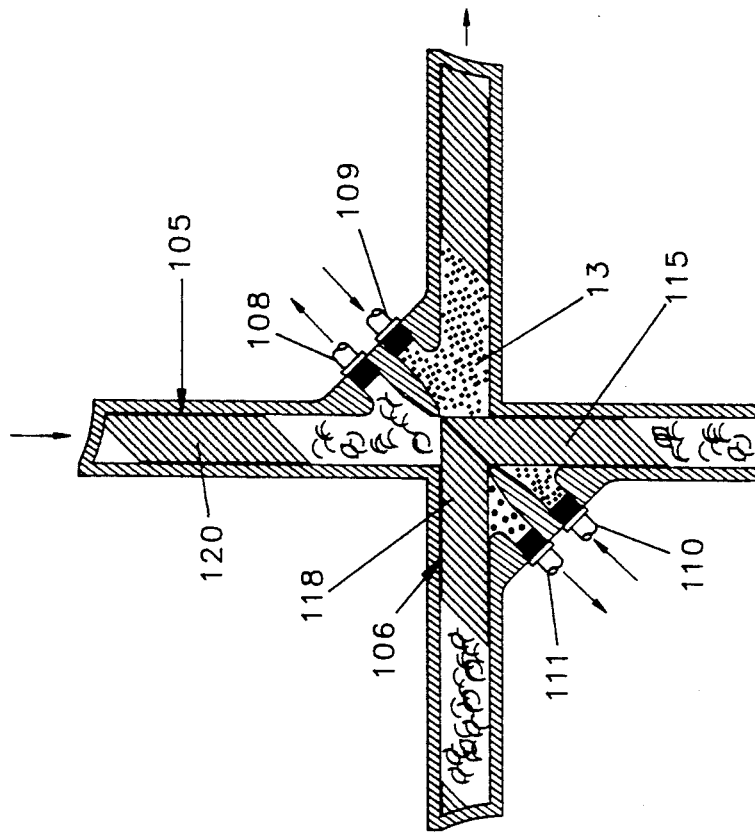

Referring to FIGS. 21 and 22 there are shown two sectional schematic views of the intersection of one of the lobes on a power rotor 98 and an intake rotor 99. In the engine 1 there would normally be a transfer pocket in the side of the power rotor to transfer compressed gas from the compression chamber located between the leading face of a lobe 101 on the intake rotor and the side of the power rotor 98, and around the corner of the housing into an ignition chamber 102. In this embodiment, the transfer pockets are replaced by a valve 103 mounted in the side wall of the housing next to the intake rotor to transfer gas under pressure into the ignition chamber 102. FIG. 21 shows the valve 103 opened under compression pressure and allowing gas to flow directly into the ignition chamber 102. FIG. 22 shows the valve 39 closed during combustion where it will remain closed while fresh intake ga enters the chamber.

Figure 23:
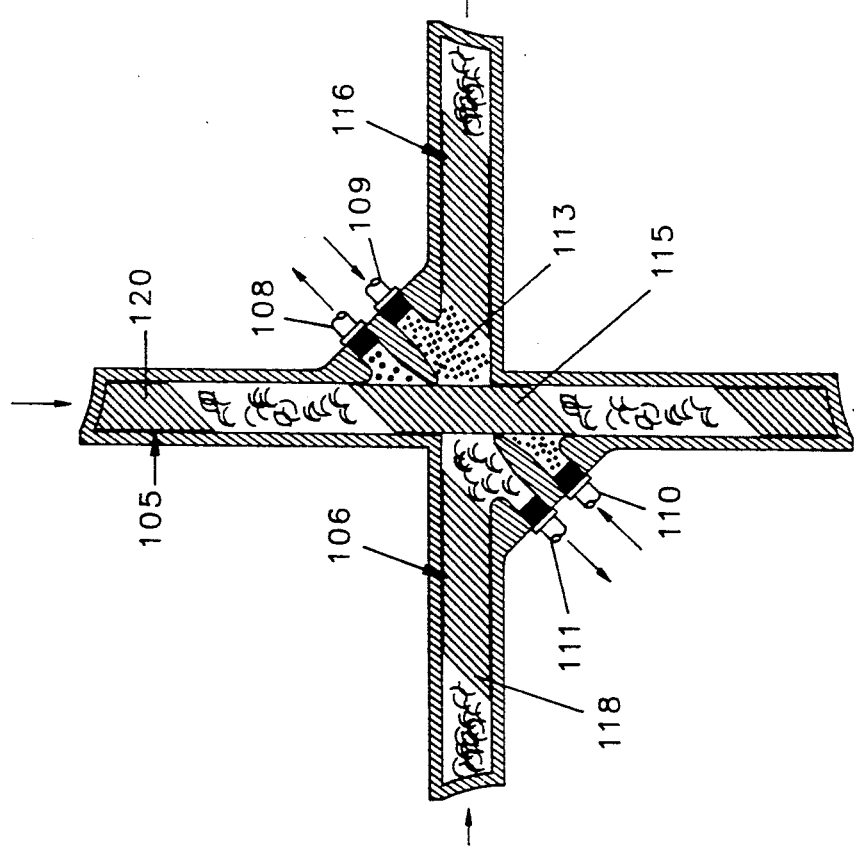

In another embodiment of the invention there is shown in FIGS. 23, 24, 25 and 26 an adaptation of the invention for use as a motor operating from an independent supply of pressurized air or gas. The device in this illustration consists of two rotors 105 and 106 geared together as in engine 1, each having two lobes and two spaces all equal in length. The lobes have no passageways, ports or cavities. Adjacent to the intersection of the rotors are four ports 108, 109, 110 and 111 in the housing on opposite sides as shown. The ports 109 and 110 are intake ports, to both of which is furnished a supply of pressurized air or gas. The ports 108 and 111 are exhaust ports. In FIG. 23 pressurized gas enters both intake ports but can only do work through the port 109 into the pressure chamber 113 between the side of the lobe 115 and the trailing face of the lobe 116. This produces rotation of the rotor 106 which, through gearing similar to that used in engine 1, also turns rotor 105. The gas between the leading face of a lobe 118 and the side of lobe 115 is expelled from port 111 while gas in the other spaces between the lobes on both of the rotors merely moves along with the lobes. Gas trying to enter the port 110 is blocked by the side of lobe 115 and remains blocked as the lobe 115 moves downward toward a confluence with the trailing face of the lobe 115 and the leading face of lobe 118 which can be seen in FIG. 24. Now lobe 115 has uncovered port 108 so that gas can be expelled from the space between the leading face of the lobe 120 and the side of lobe 118. Both ports 110 and 111 are blocked as gas still enters port 109 and maintains rotation. However, as the lobes 115 and 120 continue to move downward and lobes 116 and 118 move to the right as seen in FIG. 25, the lobe 118 has now blocked port 109 and also port 111 and acts to help expel used gas from between the side of lobe 118 and the leading face of lobe 120 through port 108. Lobe 115 has now moved down and uncovered port 110 so that pressure is now acting upon the trailing face of lobe 115 to maintain full power and rotation.

FIG. 26 now shows that the cycle has brought about the opening of both parts 110 and 111 and closed both ports 108 and 109. However, while all positions of travel cannot be shown in four views, it will be apparent to those skilled in the art that the device provides a gas or air motor with four overlapping power pulses per revolution.

CONSTRUCTION OF THE ROTORS

Figure 27:
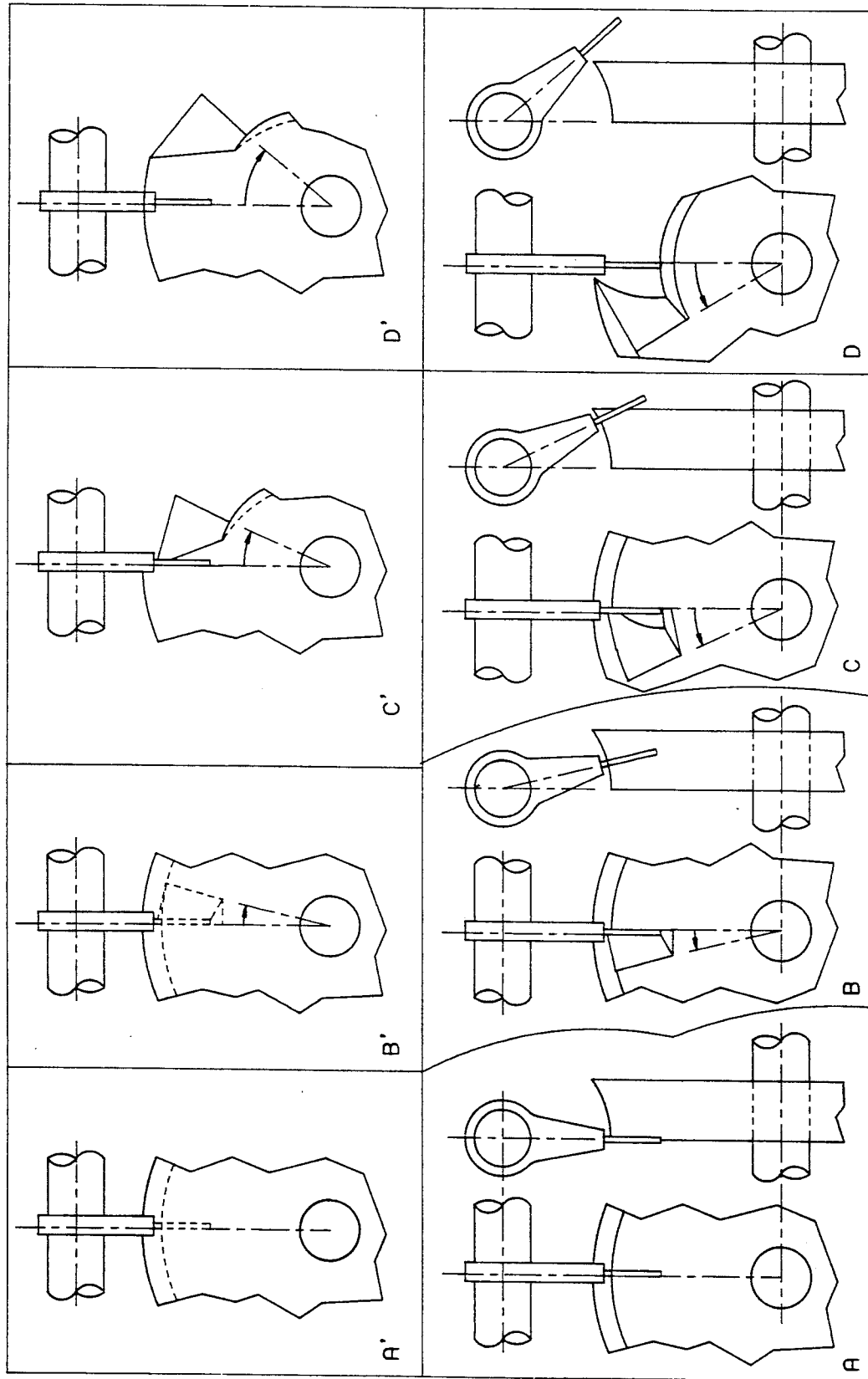
FIG. 27 is a chart made up of drawings showing the steps of one method of generation of the mating surface of the rotors used in the engine described in connection with FIGS. 1 through 26.

As described herein above, the peripheral surfaces of the lobes, the leading and trailing faces of the lobes, and peripheral surfaces of the rotors between the lobes must mate as the rotors rotate. Generation of these mating surfaces can be done mechanically with a simple cutter, or the shapes of these surfaces can be programmed into a computer and generated by robotic control. FIG. 27 is in four sections AA', BB', CC', and DD'. The first section in the lower left hand corner, identified as A, shows a front view of a cutter and its mounting with the cutter at the starting position slightly into the face of the rotor so that as the rotor and the cutting head both rotate sychronously, the cutter will generate a forward surface as shown sequentially in sections B, C, and D.

To generate a backward surface, the cutting head and rotor are positioned as shown in section in A'. The sequence of that surface generation is continued in sections B', C', and D'. Note that in cutting either the forward or backward surfaces, the edge of the cutter that contacts the face it is cutting is aligned with the center of the rotor. This is to produce a face that has the starting edge perpendicular to the curve of the rotor. If it is desired to have it slant one way or the other for reasons of the designer, both rotors should be cut so that the surfaces will mate when the rotors are mounted in the desired relationship to each other.

If the two rotors are to operate at a speed ratio other than one to one as illustrated, surface generation is done in the same way. The cutter simply operates at the comparative speed of one rotor while the piece it is working on turns at the comparative speed of the other.

While the present invention has been described in connection with particular embodiments thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed:

1. Apparatus of the type described, comprising in combination
    first and second rotor means respectively mounted for rotation about non-parallel axes,
    each of said rotor means having mutually parallel planer sides with the axis of rotation of said first rotor means lying in the plane of one of said sides of said second rotor means, and the axis of rotation of said second rotor means lying in the plane of one of said sides of said first rotor means,
    housing means enclosing first and second generally cylindrical chambers respectively enclosing said rotor means,
    means interconnecting said rotor means for mutual synchronous rotation thereof, and
    said rotor means being disposed in mutually mating relationship with each having of said rotor means having at least one lobe portion having a leading face and a trailing face, said leading face moves toward one of said side faces of the other of said rotor means as said rotor means rotate in synchronism.

2. The invention set forth in claim 1, further comprising
    means for introducing gas into the space between said leading face of said first rotor means and said side surface of said other rotor means.

3. The invention set forth in claim 2, wherein said gas is combustible, and further comprising
    means for transferring gas from the space between the leading face of said lobe on said first rotor means and said side surface of said second rotor means to the space between a trailing face of a lobe on said second rotor means and a side surface of said first rotor means,
    said trailing face of said lobe on said second rotor means moving away from said side surface of said first rotor means as said rotor means rotate in synchronism.

4. The invention set forth in claim 3, comprising
    means for exhausting gas from the space adjacent to the trailing face of said lobe on said second rotor means.

5. The invention according to claim 4, comprising
    ignition means for igniting the gas in the space between said trailing face on said lobe on said second rotor means and said side on said other rotor means.

6. The invention according to claim 5 wherein said ignition means comprises
    an ignition chamber adjacent the confluence of the lobes on said first and second rotor means.

7. The invention according to claim 6, further comprising
    spark plug means in said ignition chamber for igniting the gas therein.

8. The invention according to claim 1, comprising
    third rotor means journaled for rotation about an axis parallel to the axis of rotation of said first rotor means,
    said third rotor means having at least one lobe having a leading face which moves into mating relationship with a face of said second rotor means as said second and third rotor means rotate in synchronism with one another.

9. A rotary gas compression device, comprising in combination
    first and second rotors each having at least one peripheral lobe thereon,
    housing means enclosing said rotors,
    means for causing said rotors to rotate in said housing in synchronism with one another,
    each of said lobes having a leading and a trailing face,
    said rotors being respectively mounted for rotation about first and second mutually transverse axes with said lobes being located in mutually mating relationship during at least a portion of the rotation of said lobes,
    gas inlet means for introducing gas into the space between said leading and trailing faces of one of said rotors,
    an outlet passageway through said housing means for emitting gas from the space between said lobes on said second rotor, and
    each of said rotors having mutually parallel planer sides with the axis of rotation of said first rotor lying in the plane of one of said sides of said second rotor, and the axis of rotation of said second rotor lying in the plane of one of said sides of said first rotor.

10. A rotary operated device comprising in combination
    first and second rotor means journaled for rotation about first and second non-parallel axes and having lobes having leading and trailing faces which mate with the faces of the other rotor mans as said rotor means are rotated in synchronism,
    means for interconnecting said first and second means to cause said first and second rotor means to rotate in synchronism,
    means for introducing gas between the leading face on one of said lobes on one of said rotor means and a side of a lobe on the other on said rotor means,
    means for exhausting gas from the space adjacent to the trailing face of said lobe on said other rotor means, and
    each of said rotor means having mutually parallel planer sides, with the axis of rotation of said first rotor means lying in the plane of one of said sides of said second rotor means, and the axis of rotation of said second rotor means lying in the plane of one of said sides of said first rotor means.

11. The device set forth in claim 10 wherein said gas is introduced into the space adjacent the leading face of said first rotor means at a pressure greater than atmospheric pressure.

12. The device set forth in claim 11 further comprising external drive means for rotating said first and second rotor means.

13. A rotary gas compression device, comprising in combination a housing, a first rotor mounted in said housing for rotation about a first axis, a second rotor mounted in said housing for rotation about a second axis, said axes extending in non-intersecting non-parallel directions, each of said rotors having mutually parallel planer sides with the axis of rotation of said first rotor lying in the plane of one of said sides of said second rotor, and the axis of rotation of said second rotor lying in the plane of one of said sides of said first rotor, drive means connected between said rotors to cause said rotors to rotate in synchronism, said rotors each having at least one peripheral lobe, said lobes planar sides lying perpendicular to the axis of rotation of the respective rotor and further having leading faces, trailing faces and peripheral faces extending between said sides, said lobe of said first rotor being adapted to move sequentially past the lobe of said second rotor and said lobes of said second rotor being adapted to move sequentially past the lobe of said first rotor as said rotors are rotated in synchronism, said peripheral face of said lobe on said first rotor mating with the peripheral face of said second rotor, said peripheral face of said lobes on said second rotor mating with the peripheral face of said first rotor, a gas inlet passageway opening into the spaces adjacent said lobes on said first rotor, and a plurality of gas outlet passageways extending through said housing from positions adjacent the path of movement of the side of the lobe on said second rotor for discharging gas from said device.

14. A rotary gas compressive device according to claim 13, comprising a shaft on which said first rotor is mounted, said gas inlet passageway extending through said shaft and said first rotor.

15. A rotary gas compressive device according to claim 14, wherein said gas inlet passageway extends through said lobes on said first rotor and opens onto the spaces between said lobes on said first rotor.

16. A rotary engine according to claim 15, further comprising ignition means for igniting the gas in the said spaces between the next lobes on said first and second rotors as said lobes rotate past said ignitions means.

17. A rotary gas compression device, comprising in combination a housing, a first rotor mounted in said housing for rotation about a first axis, a second rotor mounted in said housing for rotations about a second axis, said axes extending in non-intersection, non-parallel directions, each of said rotors having mutually parallel planer sides with the axis of rotation of said first rotor lying in the plane of one of said sides of said second rotor, and the axis of rotation of said second rotor lying in the plane of one of said sides of said first rotor, drive means connected between said rotors to cause said rotors to rotate in synchronism, said rotors each having two or more angularly spaced peripheral lobes, said lobes planar sides lying perpendicular to the axis of rotation of the respective rotor and further having leading faces, trailing faces and peripheral faces extending between said sides, said lobes of said first rotor being adapted to move sequentially between the lobes of said second rotor and said lobes of said second rotor being adapted to move sequentially between the lobes of said first rotor as said rotors are rotated in synchronism, said peripheral faces of said lobes on said first rotor mating with the peripheral face portions of said second rotor located between said lobes of said second rotor, said peripheral faces of said lobes on said second rotor mating with the peripheral faces of said first rotor located between said lobes on said first rotor, a gas inlet passageway opening into the spaces between said lobes on said first rotor, and a gas outlet passageway extending through said housing from a position adjacent the path of movement of the sides of the lobes on said second rotor for discharging gas from said device.

18. A rotary gas compression device according to claim 17 comprising a shaft on which said first rotor is mounted, said gas inlet passageway extending through said shaft and said first rotor.

19. A rotary gas compression device according to claim 18 wherein said gas inlet passageway extends through said lobes on said first rotor and opens onto the spaces between said lobes on said first rotor.

20. A rotary engine, comprising in combination the rotary gas compression device according to claim 17, a combustion chamber in said housing adjacent to the paths of travel of the sides of said lobes on said first and second rotors, and ignition means disposed in said combustion chamber for igniting the gas in the said spaces between the next adjacent lobes on said first and second rotors as said lobes rotate past said combustion chamber.

21. A rotary engine according to claim 18 comprising in combination a third rotor mounted in said housing for rotation about an axis extending parallel to the axis of rotation of said first rotor, said third rotor having a plurality of angularly spaced apart lobes having parallel sides and leading edges, trailing edges and peripheral edges, said lobes of said third rotor being adapted to move sequentially between the lobes of said third rotor as said lobes of said second rotor being adapted to move sequentially between the lobes of said third rotor as as said rotors are rotated in synchronism, said peripheral edges of said lobes on said third rotor mating with peripheral edge portions of said second rotor located between said lobes of said second rotor, said peripheral edges of said lobes of said third rotor mating with the peripheral edge portions of said second rotor located between said lobes of said second rotor, said peripheral edges of said lobes on said second rotor mating with peripheral edge portions of said third rotor located between said lobes on said first rotor, a gas inlet passageway opening into the spaces between said housing from positions adjacent the path of movement of the sides of the lobes on said second rotor for discharging gas from said device.

* * * * *

UNITED STATES PATENT AND TRADEMARK OFFICE
CERTIFICATE OF CORRECTION

PATENT NO. : 5,125,379
DATED     : June 30, 1992
INVENTOR(S) : Richard D. Linville It is certified that error appears in the above-identified patent and that said Letters Patent is hereby corrected as shown below:

In column 11, at line 39, after "each" delete "having"

Signed and Sealed this

Seventh Day of September, 1993

Attest:

BRUCE LEHMAN

Attesting Officer

Commissioner of Patents and Trademarks